United States Patent
Jain et al.

(10) Patent No.: US 10,402,435 B2
(45) Date of Patent: Sep. 3, 2019

(54) UTILIZING SEMANTIC HIERARCHIES TO PROCESS FREE-FORM TEXT

(71) Applicant: Microsoft Technology Licensing, LLC, Redmond, WA (US)

(72) Inventors: Navendu Jain, Seattle, WA (US); Rajeev Dubey, Sammamish, WA (US); Adam J. Betz, Issaquah, WA (US); Bill A. Haase, Duvall, WA (US); Huy P. M. Dao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

(21) Appl. No.: 14/788,247

(22) Filed: Jun. 30, 2015

(65) Prior Publication Data

US 2017/0004205 A1    Jan. 5, 2017

(51) Int. Cl.
| | |
|---|---|
| *G06F 17/30* | (2006.01) |
| *G06F 7/00* | (2006.01) |
| *G06F 16/33* | (2019.01) |
| *G06F 16/93* | (2019.01) |
| *G06F 17/27* | (2006.01) |
| *G06N 5/02* | (2006.01) |
| *G06N 20/00* | (2019.01) |

(52) U.S. Cl.
CPC .......... *G06F 16/3344* (2019.01); *G06F 16/93* (2019.01); *G06F 17/2775* (2013.01); *G06F 17/2785* (2013.01); *G06N 5/022* (2013.01); *G06N 20/00* (2019.01)

(58) Field of Classification Search
CPC .......... G06F 17/30684; G06F 17/2775; G06F 17/2785; G06F 17/30011; G06Q 30/00

USPC ......................................................... 707/723
See application file for complete search history.

(56) References Cited

U.S. PATENT DOCUMENTS

| | | | |
|---|---|---|---|
| 4,816,994 A | 3/1989 | Freiling et al. | |
| 6,131,112 A | 10/2000 | Lewis et al. | |
| 6,446,081 B1 * | 9/2002 | Preston | ............... G06F 17/2705 707/999.104 |

(Continued)

FOREIGN PATENT DOCUMENTS

| | | |
|---|---|---|
| CN | 103885938 A | 6/2014 |
| EP | 1134727 | 9/2001 |

OTHER PUBLICATIONS

PCT Search Report for corresponding PCT International Application No. PCT/US2016/039467 dated Oct. 10, 2016, 6 pages.

(Continued)

*Primary Examiner* — Pavan Mamillapalli
(74) *Attorney, Agent, or Firm* — Schwegman Lundberg & Woessner, P.A.

(57) ABSTRACT

User feedback may be analyzed with semantic hierarchies. In some instances, the user feedback includes free-form text. The user feedback may be mapped to one or more semantic hierarchies that include multiple levels of nodes, where each node corresponds to a class. Information of the one or more semantic hierarchies may be mapped to an ontology model. The mapped information of the ontology model may be used to identify an actionable item for the user feedback, such as a problem, suggestion, question, or other issue. Information regarding the actionable item may be made available to an individual for evaluation of the actionable item.

19 Claims, 5 Drawing Sheets

(56) References Cited

U.S. PATENT DOCUMENTS

| | | | |
|---|---|---|---|
| 6,546,230 B1* | 4/2003 | Allison | G09B 7/00 |
| | | | 434/262 |
| 6,742,141 B1 | 5/2004 | Miller | |
| 6,829,734 B1* | 12/2004 | Kreulen | G06Q 30/02 |
| | | | 379/9.02 |
| 7,010,593 B2 | 3/2006 | Raymond | |
| 7,058,567 B2* | 6/2006 | Ait-Mokhtar | G06F 17/271 |
| | | | 704/1 |
| 7,209,923 B1 | 4/2007 | Cooper | |
| 7,246,159 B2 | 7/2007 | Aggarwal et al. | |
| 7,454,430 B1 | 11/2008 | Komissarchik et al. | |
| 7,644,053 B2 | 1/2010 | Kipersztok et al. | |
| 7,853,544 B2* | 12/2010 | Scott | G06F 16/353 |
| | | | 706/46 |
| 7,995,485 B1 | 8/2011 | Anderson et al. | |
| 8,032,489 B2 | 10/2011 | Villella et al. | |
| 8,112,667 B2 | 2/2012 | Belluomini et al. | |
| 8,161,325 B2 | 4/2012 | Calman et al. | |
| 8,169,921 B2 | 5/2012 | Yang et al. | |
| 8,200,527 B1* | 6/2012 | Thompson | G06Q 10/0639 |
| | | | 705/7.39 |
| 8,332,434 B2* | 12/2012 | Salkeld | G06F 16/3344 |
| | | | 707/794 |
| 8,484,224 B1 | 7/2013 | Harris et al. | |
| 8,489,530 B2 | 7/2013 | De et al. | |
| 8,515,828 B1 | 8/2013 | Wolf et al. | |
| 8,699,939 B2* | 4/2014 | German | G06Q 10/10 |
| | | | 434/322 |
| 8,747,115 B2* | 6/2014 | Lorge | G06F 16/2452 |
| | | | 434/156 |
| 8,838,599 B2 | 9/2014 | Xu et al. | |
| 9,092,802 B1 | 7/2015 | Akella | |
| 9,135,571 B2* | 9/2015 | Delaney | G06F 17/2785 |
| 9,262,438 B2 | 2/2016 | Agrawal et al. | |
| 2002/0156817 A1 | 10/2002 | Lemus | |
| 2002/0165884 A1* | 11/2002 | Kreulen | G06F 17/30011 |
| | | | 715/255 |
| 2002/0169783 A1* | 11/2002 | Kreulen | G06Q 10/107 |
| | | | 707/999.1 |
| 2003/0172046 A1 | 9/2003 | Scott | |
| 2004/0030421 A1* | 2/2004 | Haley | G06F 8/10 |
| | | | 700/49 |
| 2004/0148154 A1* | 7/2004 | Acero | G06F 17/2715 |
| | | | 704/1 |
| 2004/0148170 A1 | 7/2004 | Acero et al. | |
| 2005/0027664 A1 | 2/2005 | Johnson et al. | |
| 2005/0138486 A1 | 6/2005 | Gromyko | |
| 2005/0138556 A1* | 6/2005 | Brun | G06F 16/345 |
| | | | 715/264 |
| 2005/0154690 A1 | 7/2005 | Nitta et al. | |
| 2005/0171948 A1 | 8/2005 | Knight | |
| 2006/0010217 A1 | 1/2006 | Sood | |
| 2006/0235881 A1* | 10/2006 | Masarie | G06F 17/278 |
| | | | 707/999.107 |
| 2007/0005650 A1* | 1/2007 | Coen | G06F 17/271 |
| | | | 707/999.107 |
| 2007/0067293 A1* | 3/2007 | Yu | G06F 16/3346 |
| | | | 707/999.007 |
| 2007/0276651 A1 | 11/2007 | Bliss et al. | |
| 2008/0104032 A1* | 5/2008 | Sarkar | G06F 17/3089 |
| | | | 707/999.003 |
| 2009/0055684 A1 | 2/2009 | Jamjoom et al. | |
| 2009/0063387 A1 | 3/2009 | Beaty et al. | |
| 2010/0049590 A1 | 2/2010 | Anshul | |
| 2011/0153539 A1 | 6/2011 | Rojahn | |
| 2011/0289076 A1 | 11/2011 | Boyle et al. | |
| 2011/0295854 A1 | 12/2011 | Chiticariu et al. | |
| 2011/0307435 A1 | 12/2011 | Overell et al. | |
| 2011/0313962 A1 | 12/2011 | Jones et al. | |
| 2012/0245924 A1 | 9/2012 | Brun | |
| 2012/0290715 A1 | 11/2012 | Dinger et al. | |
| 2013/0041921 A1 | 2/2013 | Cooper et al. | |
| 2013/0110498 A1 | 5/2013 | Bekkerman | |
| 2013/0332145 A1* | 12/2013 | Bostick | G06F 17/2785 |
| | | | 704/9 |
| 2014/0006861 A1 | 1/2014 | Jain et al. | |
| 2014/0073882 A1* | 3/2014 | Choi | G16H 50/20 |
| | | | 600/301 |
| 2014/0365232 A1* | 12/2014 | Sadeghi | G16H 50/20 |
| | | | 705/2 |
| 2015/0006519 A1 | 1/2015 | Jain et al. | |
| 2015/0019461 A1 | 1/2015 | Simard et al. | |
| 2015/0142704 A1* | 5/2015 | London | G06F 16/90332 |
| | | | 706/11 |
| 2015/0178270 A1 | 6/2015 | Zuev et al. | |
| 2016/0034478 A1 | 2/2016 | Hernandez-sherrington et al. | |
| 2016/0048772 A1 | 2/2016 | Bruno et al. | |
| 2016/0092523 A1 | 3/2016 | Chandrasekaran et al. | |
| 2017/0004184 A1 | 1/2017 | Jain et al. | |
| 2017/0004205 A1 | 1/2017 | Jain et al. | |
| 2018/0090136 A1 | 3/2018 | Connell et al. | |

OTHER PUBLICATIONS

PCT Search Report and Written Opinion for corresponding PCT International Application No. PCT/US2016/039466 dated Oct. 10, 2016, 12 pages.

Barnes et al., "A Hierarchical O(N log N) Force-Calculation Algorithm", in the Journal of Nature, vol. 324, Iss. 4, Dec. 4, 1986.

Welch, "A Technique for High-Performance Data Compression", in the Journal of Computer, vol. 17, Iss. 6, Jun. 1984, 12 pages.

Yamanishi, et al., "Dynamic Syslog Mining for Network Failure Monitoring" in the Proceedings of the 2005 Eleventh ACM SIGKDD International Conference on Knowledge Discovery in Data Mining, Aug. 2005, 10 pages.

Aciar, Silvana, "Mining Context Information from Consumer's Reviews", In Proceedings of 2nd Workshop on Context-Aware Recommender Systems, Sep. 30, 2010, 5 pages.

Aguilera et al., "Performance Debugging for Distributed Systems of Black Boxes", in the Proceedings of the 19th ACM Symposium on Operating Systems Principles, Oct. 19, 2003, 16 pages.

Aho, et al., "Efficient String Matching: An Aid to Bibliographic Search", Retrieved at <<http://cisc-w09.isrl.kr/cgi- in/TUBoard/db/seminar/upload/1183356194165246034173/p333-aho-corasick.pd>>, In Communications of the ACM, vol. 18, No. 6, Jun. 1975, pp. 8.

Ahonen et al., "Applying Data Mining Techniques for Descriptive Phrase Extraction in Digital Document Collections", in the Proceedings of the 1998 IEEE International Forum on Research and Technology Advances in Digital Libraries, Apr. 1998, 10 pages.

"Attensity Text Analytics Software", In Attensity White Paper, Retrieved on: Apr. 15, 2015, 14 pages.

Barco, et al., "Automated Troubleshooting of Mobile Networks Using Bayesian Networks", Retrieved at <<http://www.lcc.uma.es/-eva/doc/materiales/barco.pdf>>, in the Proceedings of the IASTED International Conference Communication Systems and Networks, Sep. 9, 2002, pp. 6.

Barnes, et al., "A Hierarchical 0 (N log N) Force-calculation Algorithm", Retrieved at <<http://www.ecs.umass.edu/-mettu/ece665/barnes_86.pdf>>, In Letters to Nature, vol. 324, Issue 4, Dec. 1986, pp. 4.

Baysal, et al., "A Bug You Like: A Framework for Automated Assignment of Bugs", In IEEE 17th International Conference on Program Comprehension, May 17, 2013, 2 pages.

Behnel, S. et al.; "Cython: C-Extensions for Python", retrieved at <<http://cvthon.com>>, published 2008, accessed Oct. 31, 2012, 3 pages.

Bhattacharya, et al., "Automated, Highly-Accurate, Bug Assignment Using Machine Learning and Tossing Graphs", In Journal of Systems and Software, vol. 85, Issue 10, Oct. 2012, 37 pages.

Bos, et al., "Cascading style sheets, level 2 revision 1 CSS 2.1 specification", W3C working draft, W3C, Jun. 2005, 220 pages.

Bostock et al., "D3: Data-Driven Documents", in the Journal of the IEEE Transactions on Visualization and Computer Graphics, vol. 17, Iss. 12, Dec. 2011, 9 pages.

(56) References Cited

OTHER PUBLICATIONS

Brauckhoff et al., "Anomaly Extraction in Backbone Networks using Association Rules", in the Journal of IEEE/ACM Transactions on Networking (TON), vol. 20, Iss. 6, Dec. 2012, 7 pages.
Bray et al., "Extensible Markup Language (XML)", World Wide Web Consortium Recommendation REC-xml-19980210, available at ><http://www.w3.org/TR/PR-xml-971208», retrieved on Aug. 16, 2012, 42 pages.
Church et al., "Word Association Norms, Mutual Information, and Lexicography", in the Proceedings o fthe 27th Annual Meeting on Association for Computational Linguistics, Jun. 26, 1989, 8 pages.
Cohen et al., "Capturing, Indexing, Clustering, and Retrieving System History", in the Proceedings of the 20th SCM Symposium on Operating Systems Principles, Oct. 2005, 14 pages.
Cooley et al., "Web Mining: Information and Pattern Discovery on the World Wide Web", in the Proceedings of the Ninth IEEE International Conference on Tools with Artificial Intelligence, Nov. 1997, 10 pages.
Deerwester et al., "Indexing by Latent Semantic Analysis", in the Journal of the American Society for Information Science, vol. 41, No. 6, Sep. 1990, 17 pages.
Ellram, et al., "Total Cost of Ownership A Key Concept in Strategic Cost Manaoement Decisions", in the Journal of Business Logistics, vol. 19, No. 1, 1998, pp. 55-84.
"Enterprise Feedback Management", Published on: Jun. 30, 2012 Available at: <<http://www.forumresearch.com/services-enterprise-feedback-management.asp>>, 2 pages.
Fielding, "Architectural Styles and the Design of Network-based Software Architectures", Doctoral Dissertation, available at <<http://jpkc.fudan.edu.cn/picture/article/216/35/4b/22598d594e3d93239700ce79bce1/7ed3ec2a-03c2-49cb-8bf8-5a90ea42f523.pdf>>, Aug. 2012, 180 pages.
Ford et al., "Availability in Globally Distributed Storage Systems", in the Proceedings of the 9th USENIX Conference on Operating Systems Design and Implementation, Oct. 4, 2010, 14 pages.
Fruchterman, et al, "Graph drawing by force-directed placement", Software Practice and Experience, vol. 21. No. 11, Nov. 1991, pp. 1129-1164.
Garrett, "Ajax: A New Approach to Web Applications", retrieved on Aug. 16, 2012, available at <<http://scholar.googleusercontent.com/scholar?q=cache:DY1KmbMV5IMJ:scholar.google.com>>, 6 pages.
Gill et al., "Understanding Network Failures in Data Centers: Meaurement, Analysis, and Implications", in the Proceedings of the ACM SIGCOMM 2011 Conference, Aug. 15, 2011, 12 pages.
Goldstein et al., "Summarizing Text Documents: Sentence Selection and Evaluation Metrics", in the Proceedings of the 22nd Annual International ACM SIGIR Conference on Research and Development in Information Retrieval, Aug. 1999, 8 pages.
Gruber, "Toward principles for the design of ontologies used for knowledge sharing", in the International Journal of Human-Computer Studies—Special issue: the Role of Formal Ontology in the Information Technology, vol. 43, Iss. 5-6, Nov./Dec. 1995.
Gruschke, "Integrated event management Event Correlation Using Dependency Graphs", in the Proceedings of the 9th IFIP/IEEE International Workshop on Distributed Systems, Operations and Management Oct. 1998, 12 pages.
Heim, "Anaphora and Semantic Interpretation: A Reinterpretation of Reinhart's Approach", MIT Working Papers in Linguistics 25, 1998; pp. 205-246.
Hickson, "A Vocabulary and Associated APIs for HTML and XHTML", Editor's Draft, available at: <<https://sonnycc.files.wordpress.com/2010/12/html5.pdf>>, 23 pages.
Huang, et al., "Diagnosing Network Disruptions with Network-Wide Analysis", Retrieved at <<http://www.cc.gatech.edu/-jx/reprints/metrics160.pdf>>, in the Proceedings of the ACM SIGMETRICS International Conference on Measurement and Modeling of Computer Systems, Jun. 12, 2007, pp. 12.
Johnson, "NOC Internal Integrated Trouble Ticket System Functional Specification Wishlist ("NOC TT Requirements")", Merit Network Inc., Jan. 1992, 13 pages.

Jonsson, et al., "Automated Bug Assignment: Ensemble-based Machine Learning in Large Scale Industrial Contexts", In Proceedings of Empirical Software Engineering, Retrieved on Apr. 29, 2015, 52 pages.
"JQuery", available at <<http://jquery.com/>>, retrieved on Aug. 7, 2012, 1 page.
Justeson, et al., "Technical terminology: some linguistic properties and an algorithm for identification in text", Natural Language Engineering: vol. 1, No. 1, Mar. 1995, pp. 9-27.
Kandula, et al., "Detailed Diagnosis in Enterprise Networks", Retrieved at <<http://research.microsoft.com/pubs/80590/sigcomm09-395.pdf>>, in the Proceedings of the ACM SIGCOMM Conference on Data Communication, Aug. 17, 2009, pp. 12.
Kandula, et al., "What's Going On? Learning Communication Rules in Edge Networks", Retrieved at <<http://citeseerx.ist.psu.edu/viewdoc/download?doi=10.1.1.145.3918&rep=rep1&type=pdf>>, in the Proceedings of the ACM SIGCOMM Conference on Data Communication, Aug. 17, 2008, pp. 12.
Khanna et al., "Automated Rule-Based Diagnosis through a Distributed Monitor System", in the Journal of IEEE Transactions on Dependable and Secure Computing, vol. 4, Iss. 4, Oct. 2007, 14 pages.
Konig et al., "Reducing the Human Overhead in Text Categorization", in the Proceedings of the 12th ACM SIGKDD International Conference on Knowledge Discovery and Data Mining, Aug. 2006, 6 pages.
Labovitz et al., "Experimental Study of Internet Stability and Backbone Failures", in the Proceedings of the Twenty-Ninth Annual International Symposium on Fault-Tolerant Computing, Jun. 1999, 8 pages.
Lang, et al., "Enhancing Business Intelligence with Unstructured Data", In Proceedings of Conference on Database Systems in Business, Technology and Web, Mar. 2, 2009, pp. 469-485.
Law, et al. "An Integrated Case Based Reasoning Approach for Intelligent Help Desk Fault Management", 1997, Expert Systems with Applications, vol. 13, No. 4, pp. 265-274.
Lim et al., "A Log Mining Approach to Failure Analysis of Enterprise Telephony Systems", in the Proceedings of the 2008 IEEE International Conference on Dependable Systems and Networks with FTCS and DCC, Jun. 2008, pp. 398-403.
Loper, et al., "NLTK: The Natural Language Toolkit", Retrieved at <<http://arxiv.org/pdf/cs/0205028v1.pdf>>, In Proceedings of the Workshop on Effective Tools and Methodologies for Teaching Natural Language Processing and Computational Linguistics, May 17, 2002, pp. 8.
MacKay, "Information Theory, Inference, and Learning Algorithms", Cambridge University Press, Aug. 25, 2004.
Manber, et al., "Suffix arrays A New Method for on-Line String Searches", Retrieved at <<http://webglimpse.net/pubs/suffix.pdf>>, In Proceedings of the First Annual ACM-SIAM Symposium on Discrete Algorithms, Jan. 22, 1990, pp. 16.
Mani, et al., "The Tipster Summac Text Summarization Evaluation", Retrieved at <<http://acl.ldc.upenn.edu/E/E99/E99-1011.pdf>>, In Proceedings of the Ninth Conference on European Chapter of the Association for Computational Linguistics, Jun. 8, 1999, pp. 9.
Manning, et al., "Foundations of Statistical Natural Language Processing", Retrieved at <<http://cs.famaf.unc.edu.ar/laura/llibres/snlp.pdf>>, In Book of Foundations of Statistical Natural Language Processing, Jun. 18, 1999, pp. 1-353. Part 1.
Manning, et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, pp. 504.
Marcus, et al., "Building a Large Annotated Corpus of English The Penn Treebank", Retrieved at <<http://delivery.acm.org/10.1145/980000/972475/p313-marcus.pdf>>, In Journal of Computational Linguistics—Special Issue on Using Large Corpora, vol. 19, Issue 2, Jun. 1993, pp. 18.
McCallum, et al., "Early Results for Named Entity Recognition with Conditional Random Fields, Feature Induction and Web-Enhanced Lexicons", Retrieved at <<http://people.cs.umass.edu/~mccallum/

(56) References Cited

OTHER PUBLICATIONS papers/mccallum-conll2003.pdf>>, In Proceedings of the Seventh Conference on Natural language learning at HLT-NAACL, vol. 4, May 31, 2003, pp. 4.

Medem, et al., "TroubleMiner: Mining Network Trouble Tickets", Retrieved at <<http://ieeexplore.ieee.org/stamp/stamp.jsp?tp=&amumber5195946>>, In IFIP/IEEE International Symposium on Integrated Network Management-Workshops, Jun. 1, 2009, pp. 7.

Melchiors, et al., "Troubleshooting Network Faults Using Past Experience", Retrieved at <<http://ieeexplore.ieee.org/stamp/stamp.jsp?amumber=00830413>>, In IEEE/IFIP Network Operations and Management Symposium, Apr. 10, 2000, pp. 14.

Mitra, et al., "Automatic Text Summarization by Paragraph Extraction", Retrieved at <<http://www.aclweb.org/anthology-new/W/W97/W97-0707.pdf>>, In Proceedings of the Workshop on Intelligent Scalable Summarization at the ACL/EACL Conference, Jul. 7, 1997, pp. 8.

Muehlen, et al., "Developing Web Services Choreography Standards The Case of REST vs. SOAP", Retrieved at <<http://citeseerx.ist.psu.edu/viewdoc/download?doi=10.1.1.80.94&rep=rep&type=pdf>>, In Journal of Decision Support Systems Special Issue, Jul. 2005, pp. 35.

"N-Gram Extraction Tools", retrieved at <<http://goo.gl/VNTJa>>, accessed on Oct. 31, 2012, 3 pages.

Nagao, et al., "A New Method of N-Gram Statistics for Large Number of N and Automatic Extraction of Words and Phrases from Large Text Data of Japanese", Retrieved at <<http://delivery.acm.org/10.1145/1000000/991994/p611-nagao.pdf>>, In COLING '94 Proceedings of the 15th Conference on Computational linguistics, vol. 1, Aug. 5, 1994, pp. 5.

Noy, et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, pp. 25.

Paolacci, et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, pp. 9.

Potharaju, et al., "Juggling the Jigsaw: Towards Automated Problem Inference from Network Trouble Tickets", In Proceedings of 10th USENIX Symposium on Networked Systems Design and Implementation, Apr. 2, 2013, pp. 127-141.

Qiu, et al., "What Happened in My Network Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, pp. 13.

Raghavendra, et al., "No Power Struggles: Coordinated Multi-level Power Management for the Data Center", Retrieved at <<http://www.cs.pitt.edu/~kirklcs3150spring2010/2008_asplos_nopowerstruggles.pdf>>, In ACM SIGOPS Operating Systems Review, vol. 42, Issue 2, Mar. 1, 2008, pp. 12.

Roughan, et al., "IP Forwarding Anomalies and Improving their Detection Using Multiple Data Sources", in the Proceedings of the ACM SIGCOMM Workshop on Network Troubleshooting: Research, Theory and Operations Practice Meet Malfunctioning Reality, Sep. 2004, 6 pages.

Seemakurty, et al., "Word Sense Disambiguation via Human Computation", Retrieved at <<http://www.cs.cmu.edu/~tomasic/doc/2010/SeemakurtyEtAlIHCOMP2010.pdf>>, In Proceedings of the ACM SIGKDD Workshop on Human Computation, Jul. 25, 2010, pp. 4.

Shokripour, et al., "Automatic Bug Assignment Using Information Extraction Methods", In Proceedings of International Conference on Advanced Computer Science Applications and Technologies, Nov. 26, 2012, 6 pages.

Simm, et al., "Classification of Short Text Comments by Sentiment and Actionability for VoiceYourView", In Proceedings of IEEE International Conference on Social Computing / IEEE International Conference on Privacy, Security, Risk and Trust, Aug. 20, 2010, pp. 552-557.

Smadja, Frank., "Retrieving Collocations from Text: Xtract", Retrieved at <<http://acl.ldc.upenn.edu/J/J93/J93-1007.pdf>>, In Journal of Computational Linguistics—Special Issue on Using large Corpora, Mar. 1993, pp. 36.

Sorokin, et al., "Utility Data Annotation with Amazon Mechanical Turk", Retrieved at <<http://ieeexplore.ieee.org/stamp/stamp.jsptp=arnumber=4562953>>, In IEEE Computer Society Conference on Computer Vision and Pattern Recognition Workshops, Jun. 23, 2008, pp. 8.

Spasic et al., "Text mining and ontologies in biomedicine: Making sense of raw text", in the Journal of Briefing in Bioinformatics, vol. 6, No. 3, Sep. 2005, pp. 239-251.

"SQL Server", Retrieved at <<http://www.microsoft.com/sqlserver/en/us/default.aspx>>, Aug. 8, 2012, pp. 12.

Sukumaran, et al., "Integrating Structured and Unstructured Data Using Text Tagging and Annotation", In the Data Administration Newsletter, May 29, 2007, 6 pages.

Toutanova, et al., "Enriching the Knowledge Sources Used in a Maximum Entropy Part-of-Speech Tagger", Retrieved at <<http://nlp.stanford.edu/~manning/papers/emnlp2000.pdf>>, In Proceedings of the Joint SIGDAT Conference on Empirical Methods in Natural Language Processing and Very Large Corpora, Oct. 7, 2000, pp. 8.

Turner et al., "California Fault Lines: Understanding the Causes and Impact of Network Failures", in the Proceedings of the ACM SIGCOMM 2010 Conference, Aug. 2010, 12 pages.

Ukkonen, "On-line Construction of Suffix Trees", in the Journal of Algorithmica, vol. 14, Iss. 3, Sep. 1995, pp. 249-260.

von Ahn, "Games with a Purpose", in the Journal of Computer, vol. 39, Iss. 6, Jun. 2006, pp. 92-94.

von Ahn et al., "Labeling Images with a Computer Game", in the Proceedings of the SIGCHI Conference on Human Factors in Computing Systems, Apr. 2004, 20 pages.

Weight, "Allegiance: How Text Analytics Changes Everything", Retrieved on: Apr. 15, 2015, available at: <<https://www.allegiance.com/documents/text_analytics.pdf>>, 6 pages.

Wu et al., "Open Information Extraction using Wikipedia", in the Proceedings of the 48th Annual Meeting of the Association for Computational Linguistics, Jul. 2010, 10 pages.

Xu et al., "Detecting Large-Scale System Problems by Mining Console Logs", in the Proceedings of the ACM SIGOPS 22nd Symposium on Operating Systems Principles, Oct. 2009, 16 pages.

Yamamoto et al., "Using Suffix Arrays to Compute Term Frequency and Document Frequency for All Substrings in a Corpus", in the Journal of Computational Linguistics, vol. 27, Iss. 1, Mar. 2001, 30 pages.

Yuan et al., "SherLog: Error Diagnosis by Connecting Clues from Run-time Logs", in the Proceedings of the Fifteenth Edition of ASPLOS on Architectural Support for Programming Languages and Operating Systems, Mar. 2010, 12 pages.

Zhang et al., "Extraction of Chinese Compound Words—An Experimental Study on a Very Large Corpus", in the Proceedings of the Second Workshop on Chinese Language Processing: held in conjunction with the 38th Annual Meeting of the Association for Computational Linguistics, vol. 12, Oct. 2000, 8 pages.

Ziefle, "Effects of display resolution on visual performance", Human Factors, The Journal of the Human Factors and Ergonomics Society, vol. 40, No. 4, 1998, pp. 554-568.

Ensan, et al., "Towards Domain-Centric Ontology Development and Maintenance Frameworks", In Proceedings of the 19th International Conference on Software Engineering & Knowledge Engineering, Jul. 9, 2007, 6 Pages.

Patrick, et al., "Improving Accuracy of Identifying Clinical Concepts in Noisy Unstructured Clinical Notes using Existing Internal Redundancy", In Proceedings of the Fourth Workshop on Analytics for Noisy Unstructured Text Data, Oct. 26, 2010, pp. 35-42, 8 Pages.

"Non Final Office Action Issued in U.S. Appl. No. 15/487,960", dated Nov. 1, 2018, 77 Pages.

"Non Final Office Action Issued in U.S. Appl. No. 14/788,695", dated Aug. 22, 2017, 15 Pages.

(56) References Cited

OTHER PUBLICATIONS

"International Preliminary Report on Patentability Issued in PCT Application No. PCT/US2016/039466", dated Sep. 4, 2017, 8 Pages.

"Second Written Opinion Issued in PCT Application No. PCT/US2016/039466", dated Jun. 6, 2017, 7 Pages.

"Final Office Action Issued in U.S. Appl. No. 15/487,960", dated Apr. 24, 2019, 76 Pages.

* cited by examiner

UTILIZING SEMANTIC HIERARCHIES TO PROCESS FREE-FORM TEXT

BACKGROUND

Users often provide feedback regarding services, software or hardware elements through various means. In some instances, the feedback relates to bugs or other issues with the software or hardware, while in other instances the feedback relates to questions, issues, or recommendations for improving the software or hardware. In yet further instances, the feedback includes text or other information, such as a general description about how the software or hardware works, a feature that a user likes or dislikes, information that is not related to the software or hardware, and so on. For example, a user might use a support interface provided by an operating system to let an administrator know about features that the user likes and problems that the user is having with a particular feature of the operating system. The feedback is typically manually viewed and evaluated by administrators of the service, software or hardware to identify bugs or other issues with the software or hardware that need fixing. Since the feedback is manually evaluated, and often encompasses multiple different types of information (which may or may not be applicable to the administrators), the administrators spend considerable time analyzing the feedback.

SUMMARY

This disclosure describes techniques and architectures for automatically analyzing free-form text with semantic hierarchies. In some instances, a document may be received that includes free-form text regarding feedback from a user. The document (e.g., text of the document) may be mapped to one or more semantic hierarchies and information of the one or more semantic hierarchies may be mapped to an ontology model. For example, a word or phrase of a document may be mapped to a level in a semantic hierarchy that represents a class of customer terms. The semantic hierarchy may be traversed to a higher level that represents a class that may share a common meaning with the customer terms. The semantic hierarchy may be traversed any number of levels higher to different classes. A class from a level of the semantic hierarchy may be mapped to a class of an ontology model.

The mapped information of the ontology model may be used to identify an actionable item in the document. For example, a word or phrase in the document may be tagged with a class that is identified from the ontology model. A structure of the tagged words or phrases (e.g., a grammar pattern) may be used to determine an actionable item for the document, such as a problem, suggestion, question, or other issue. Information regarding the actionable item may be made available to an individual for evaluation of the actionable item. This information can additionally, or alternatively, be aggregated across documents for analysis (e.g., trend analysis, top-k problems, suggestions by frequency, etc.). Further, this information may be used in a variety of other manners.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
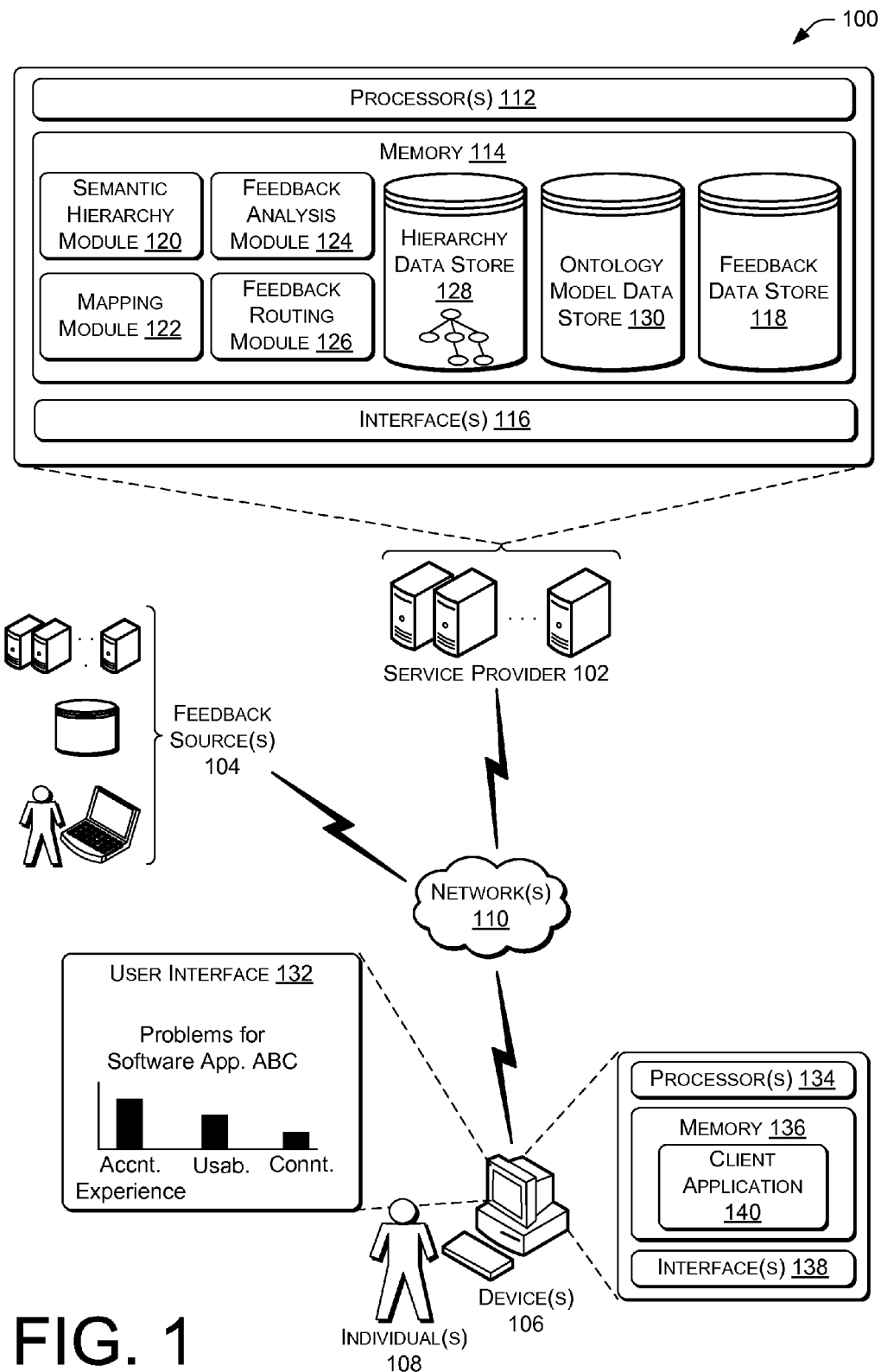
FIG. 1 illustrates an example architecture in which techniques described herein may be implemented.

This disclosure describes techniques and architectures for evaluating free-form text using semantic hierarchies. In many instances, the techniques and architectures may analyze one or more pieces of free-form text with semantic hierarchies to identify actionable items and route information about the actionable items to particular individuals for evaluation. An actionable item may include a problem, suggestion, question, or other issue regarding software, hardware, or another entity. In one example, an administrator that manages a particular software element may be informed of a problem (e.g., bug) with the particular software element, a type of the problem, how often the problem has been identified in user feedback, and so on. In another example, the administrator may be provided with information about a suggestion for improvement of the software. In yet another example, the administrator may receive information regarding other actionable items. Based on the information, the administrator may fix a problem with the software, implement a new feature, answer a question, and/or perform a variety of other acts.

In one implementation of the techniques described herein, a service provider may collect one or more documents that include free-form text (e.g., user feedback). The one or more documents may be collected from a variety of sources, such as online sources, customer support portals, electronic messages, conversations with a customer or intelligent personal assistant, and so on. The one or more documents may include at least some free-form text provided by a user (e.g., text in a natural language). Further, the one or more documents may include a variety of information which may or may not be relevant to an actionable item. For example, a document may include a sentence, phrase, or clause regarding a problem that a user is having with a software element, a sentence regarding a feature of the software element for which the user has indicated an interest (e.g., a feature the user likes), a sentence that is unrelated to the software element, and so on.

The service provider may analyze (e.g., automatically) a document based on one or more semantic hierarchies. A semantic hierarchy may generally include multiple levels of nodes, where each node corresponds to a grouping or a class. To illustrate, a semantic hierarchy may include a first level having a node representing customer terms, a second level having a node representing morphological forms of the customer terms or technical terms for the customer terms (e.g., engineering terms, programming terms, administrator terms, etc.), a third level having a node that maps the morphological forms of the customer terms from the second level to terminology used by a specific group (e.g., an engineering group), and a fourth level having a node that groups one or more nodes of the third level. In analyzing a document, the service provider may map a word or phrase of the document to a level in a semantic hierarchy (e.g., map the word or phrase to a node that represents customer terms). The service provider may then traverse the semantic hierarchy from the node at that level up to a node at highest level (or at least a higher level than the mapped level). A node at that level or at a higher level may then be mapped to a class of an ontology model. The ontology model may be used to express different classes and relationships between the classes. The service provider may tag the word or phrase of the document with one or more classes that are identified from the ontology model. This process may be repeated to tag individual words or phrases of the document.

The service provider may then determine a concept for individual text segments (e.g., sentences, phrases, etc.) of the document. For example, a tagged text segment that matches a grammar pattern that is associated with a particular concept may be identified as being related to the particular concept. If a tagged text segment matches a pre-defined grammar pattern associated with an actionable item (e.g., a problem, suggestion, question, etc.), the tagged text may be associated with that actionable item. In other words, the service provider may determine that the tagged text segment describes a problem, a suggestion, a question, or other item that may be addressed (e.g., by performing a task).

The service provider may make information available regarding actionable items. The information may be made available in a variety of manners to a variety of individuals. In one example, a problem with a software entity may be routed to an individual that manages the software entity (e.g., sent in an email, provided via an interface, etc.). In another example, an individual may request actionable items for a particular entity (e.g., show problems associated with a particular messaging application). Further, the service provider may make various types of information available regarding the actionable items. In one example, the information identifies a type of problem that has occurred with a software or hardware entity. The type of problem may be based on a mapping of associated text for the actionable item to a semantic hierarchy (e.g., a class of a node that is identified in the semantic hierarchy). For instance, if an "account experience" node is identified in a semantic hierarchy (e.g., for user feedback that states "I'm having trouble logging in to my email account"), the information may indicate that the problem with the email entity is of type "account experience." In yet another example, information regarding actionable items may include a ranking of the actionable items. For instance, if an individual requests to view the top problems with an instant messaging application, the service provider may provide a ranking of problems (e.g., based on frequency or user importance) that are identified for the instant messaging application across user feedback from multiple users.

In some instances, the techniques and architectures described herein may automatically analyze free-form text to normalize the free-form text. For example, by mapping free-form text to semantic hierarchies and/or ontology models, the free-form text may be grouped according to various classes of words or phrases. This may increase consistency of words across various contexts. For example, a customer term for a problem with a software element may be mapped to a class that represents a technical term used by an administrator of the software element (e.g., additional desktop as the customer term and virtual desktop as the administrator term). Further, the techniques and architectures may analyze text in the form in which the text is presented (e.g., analyze a word or phrase based on surrounding words or phrases).

In addition, the techniques and architectures may provide information that may be useful in a variety of contexts. For example, an administrator of a software element may view information about problems, suggestions, or other actionable items for the software element. The information may identify a type of an actionable item, an occurrence of the actionable item in user feedback for multiple users (e.g., ranking or aggregating actionable items), and so on. Based on the information, the administrator may fix a bug, implement a new feature, prioritize bugs fixes, prioritize new feature implementations, or perform a variety of other tasks. This may assist the administrator in managing the software element by reducing the amount of time spent reviewing user feedback. Further, by routing the information to a designated individual in a timely manner, user experience with the software element may be improved as software, hardware, or other items are updated more quickly.

In many instances, the techniques and architectures are described herein in the context of actionable items for software or hardware. However, the techniques and architectures may be applicable to a wide variety of contexts, such as in a consumer context where feedback regarding consumer products is analyzed, a vehicle context where feedback regarding vehicles is analyzed, a consumable item context where feedback regarding consumable items is analyzed (e.g., food), a service context where feedback regarding a service is analyzed (e.g., restaurant service or another business service), and so on.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are only examples of many.

Example Architecture

FIG. 1 illustrates an example architecture 100 in which techniques described herein may be implemented. The architecture 100 includes a service provider 102 configured to analyze user feedback, provide information regarding the analysis, and perform a variety of other operations. The service provider 102 may receive user feedback from one or more feedback sources 104 (hereinafter "the feedback sources 104"), such as computing devices (e.g., servers, client devices, etc.), data stores, and so on. In some instances, the feedback sources 104 are associated with respective users. The service provider 102 may analyze the user feedback with semantic hierarchies and provide information about the analysis to one or more devices 106 (hereinafter "the device 106") employed by one or more individuals 108 (hereinafter "the individual 108"). The information may identify actionable items within the user feedback, such as problems, suggestions, questions, or other items. The individual 108 may view the information and perform an action that addresses the actionable item, such as fixing a bug, implementing a new feature, answering a question, and so on. The individual 108 may be an administrator (e.g., engineer, programmer, manager, developer, designer, etc.), an end-user, or any other individual. The service provider 102, the feedback sources 104, and/or the device 106 may communicate via one or more networks 110. The one or more networks 110 may include any one or combination of multiple different types of networks, such as cellular networks, wireless networks, Local Area Networks (LANs), Wide Area Networks (WANs), Personal Area Networks (PANs), and the Internet.

The service provider 102 may be implemented as one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, network resources, storage resources, and the like, that operate remotely to the device 106.

The one or more computing devices of the service provider 102 may be equipped with one or more processors 112, memory 114, and/or one or more interfaces 116 (hereinafter "the interface 116"). The one or more processors 112 may include a central processing unit (CPU), graphics processing unit (GPU), a microprocessor, and so on. The interface 116 may include a network interface, a display device interface, and so on.

In many instances, the service provider 102 may receive user feedback from the feedback sources 104 via the interface 116. For example, the service provider 102 may communicate with each of the feedback sources 104 over the one or more networks 110 to collect documents regarding user-generated feedback. A document may be a physical or electronic document having any type of content including text (e.g., structured or unstructured (free-form)), images, audio, and so on. The feedback sources 104 may include online sources (e.g., blogs, social networking sites, websites, etc.), customer support portals (e.g., for discussing issues with customer agents or intelligent personal assistants or for otherwise sending feedback), web services, support services for an operating system or other software/hardware, call centers, and so on. As such, a document may include electronic messages (e.g., text messages, emails, etc.), conversation data (e.g., from a conversation with a customer support individual or intelligent personal assistant, from a conversation over an Instant Messaging (IM) application, etc.), telephone data from a telephone conversation, data from an evaluation form (e.g., electronic questionnaire form, electronic review form, etc.), User-Initiated Feedback (UIF), content posted to an online site (e.g., blog, social networking site, etc.), user reviews (e.g., of a products or services), failure logs (e.g., device or application logs, etc.), support tickets (e.g., network support tickets, etc.), and so on. User feedback may be stored in a feedback data store 118 for further analysis.

The memory 114 may include software functionality configured as one or more "modules." As used herein, the term "module" is intended to represent example divisions of software for purposes of discussion, and is not intended to represent any type of requirement or required method, manner, or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-Chip Systems (SOCs), Complex Programmable Logic Devices (CPLDs), etc.

As illustrated, the memory 114 includes a semantic hierarchy model 120, a mapping module 122, a feedback analysis module 124, and a feedback routing module 126. Each of the modules 120-126 may be executable by the one or more processors 112 to perform specific operations. Although in the example architecture 100 of FIG. 1 the modules 120-126 are illustrated as being included in the service provider 102, one or more of these modules may be included in the device 106 or any other device.

The semantic hierarchy module 120, the mapping module 122, the feedback analysis module 124, and/or the feedback routing module 126 may operate in cooperation to analyze user feedback and provide information regarding the analysis. The semantic hierarchy module 120 may generate semantic hierarchies, while the mapping module 122 may map user feedback to the semantic hierarchies and/or ontology models. Further, the feedback analysis module 124 may utilize the mappings to analyze the user feedback, and the feedback routing module 126 may provide information regarding the analysis.

The semantic hierarchy module 120 may manage one or more semantic hierarchies stored in a hierarchy data store 128. A semantic hierarchy may include various nodes to represent classes or subclasses. A class or subclass may generally represent or include a grouping of one or more words or phrases. Nodes of a semantic hierarchy may form different levels, where each level may be applicable to a different context. This may allow a word or phrase to be transformed from one class to another class (e.g., one context to another). For example, one level in a semantic hierarchy may represent customer terms (e.g., "split windows"), while another level in the semantic hierarchy may represent technical terms that are used by administrators when referring to the customer terms (e.g., "divided screen view"). Yet another level in the semantic hierarchy may represent a software entity or entity state for the technical terms (e.g., "user interface" entity). A semantic hierarchy may generally provide a normalized interpretation of a word or phrase or group related words or phrases together. In some instances, a semantic hierarchy may be used to convert from diverse forms to a canonical, normalized representation (e.g., converting "confused" and "confusing" to "confuse," which are syntactically equivalent forms, and converting "failure" and "crash" to reliability problems, which are semantically equivalent forms). Further, a semantic hierarchy may be used to route user feedback, as discussed in further detail below. In some examples, a semantic hierarchy may be referred to as a synonym chain or hierarchy. Example semantic hierarchies are discussed below in reference to FIG. 2.

A semantic hierarchy may be of a variety of types. In some instances, a semantic hierarchy is classified into either an entity hierarchy or an entity state hierarchy. An entity hierarchy may include nodes that represent entity classes (e.g., classes representing things, such as products, features, services, or components). For example, an entity class may represent or include words related to a feature, product, software, or thing, such as "account," "password," "drive," "keyboard," "mouse," "screen," "computer," "phone,"

"interface," etc. To illustrate, an account experience entity node may represent words related to passwords and accounts. There may be different entity hierarchies for different types of entities.

Meanwhile, an entity state hierarchy may include nodes that represent a state of an entity. A state of an entity may describe a property, mode or (abnormal) condition (either physical or virtual) associated with an entity, such as "failing to execute," "crashing," "working intermittently," etc. A state of an entity may be binary (e.g., up vs. down), subjective (e.g., crashing), categorical (e.g., low, high, etc.), quantitative (e.g., "level 3") or other type as well as their combinations. Example entity state nodes include nodes that relate to action classes, condition classes (e.g., problem classes or bug classes), question classes, certainty classes, submission indicator classes (e.g., suggestion classes or modal indicator classes), quantity classes, emotion classes, etc. An action class may include words or phrases that represent a behavior that is taken or carried out on or using an entity, or a behavior performed by an entity, such as "click," "browse," etc. A problem class may represent words or phrases that represent a problem or issue with an entity, such as "crashing," "disconnected," etc. A submission indicator class (e.g., suggestion class or modal-indicator class) may include words or phrases that relate to a new behavior or change in an existing behavior of an entity, such as "add new shortcut," "change API call/settings name," "remove animations," etc. For example, the suggestion class may include words or phrases that relate to a feature request by a user. A question class may include words or phrases that are used to elicit information, such as "what does this mean," or "how does this work," etc. An emotion class may include words or phrases that represent feelings or beliefs of a user, such as "like new app interface," "find animations confusing," etc. There may be different entity state hierarchies for different types of entity states. In some instances, an entity class or an entity state class of a semantic hierarchy may be defined by a corresponding class of an ontology model. As noted below, a class of a semantic hierarchy may map to one or more classes of an ontology model.

In some instances, the semantic hierarchy module 120 may generate a semantic hierarchy automatically through machine learning or other techniques. The semantic hierarchy may be generated in real-time as needed to analyze user feedback or may be generated before an analysis. To automatically generate a semantic hierarchy, a classifier may learn to group words or phrases into classes and/or learn to group classes. To illustrate, the classifier may learn that terms of "confuse" and "annoy" relate to a usability problem (e.g., with a software element), and group those terms into a semantic hierarchy. That is, a node may be created for the semantic hierarchy to represent a class for "usability problems." The node may group a node of a lower level that represents the term "confuse" with a node of a lower level that represents the term "annoy." In other instances, the semantic hierarchy module 120 may generate a semantic hierarchy based on user input from an individual, such as an administrator that manages software or hardware. To illustrate, the administrator may provide input indicating that the term "confuse" should be grouped with the term "annoy" for "usability problems." Based on the input, a node that represents the term "annoy" may be grouped with a node that represents the term "confuse."

The mapping module 122 may map words or phrases to semantic hierarchies. For instance, the mapping module 122 may map a word or phrase from user feedback to a lowest level in a semantic hierarchy and traverse the semantic hierarchy to a particular level (e.g., a highest level in the semantic hierarchy, a requested level, a predetermined level, etc.). To illustrate, a user phrase "split windows" may be mapped to a node in a semantic hierarchy that represents such phrase (e.g., a node at a lowest level that represents customer words or phrases). The semantic hierarchy may then be traversed to a node of a next highest level that represents a technical phrase of "divided screen view" that corresponds to the phrase "split windows." The semantic hierarchy may then be traversed to a node of a next highest level that represents a class representing a user interface entity.

Figure 3:
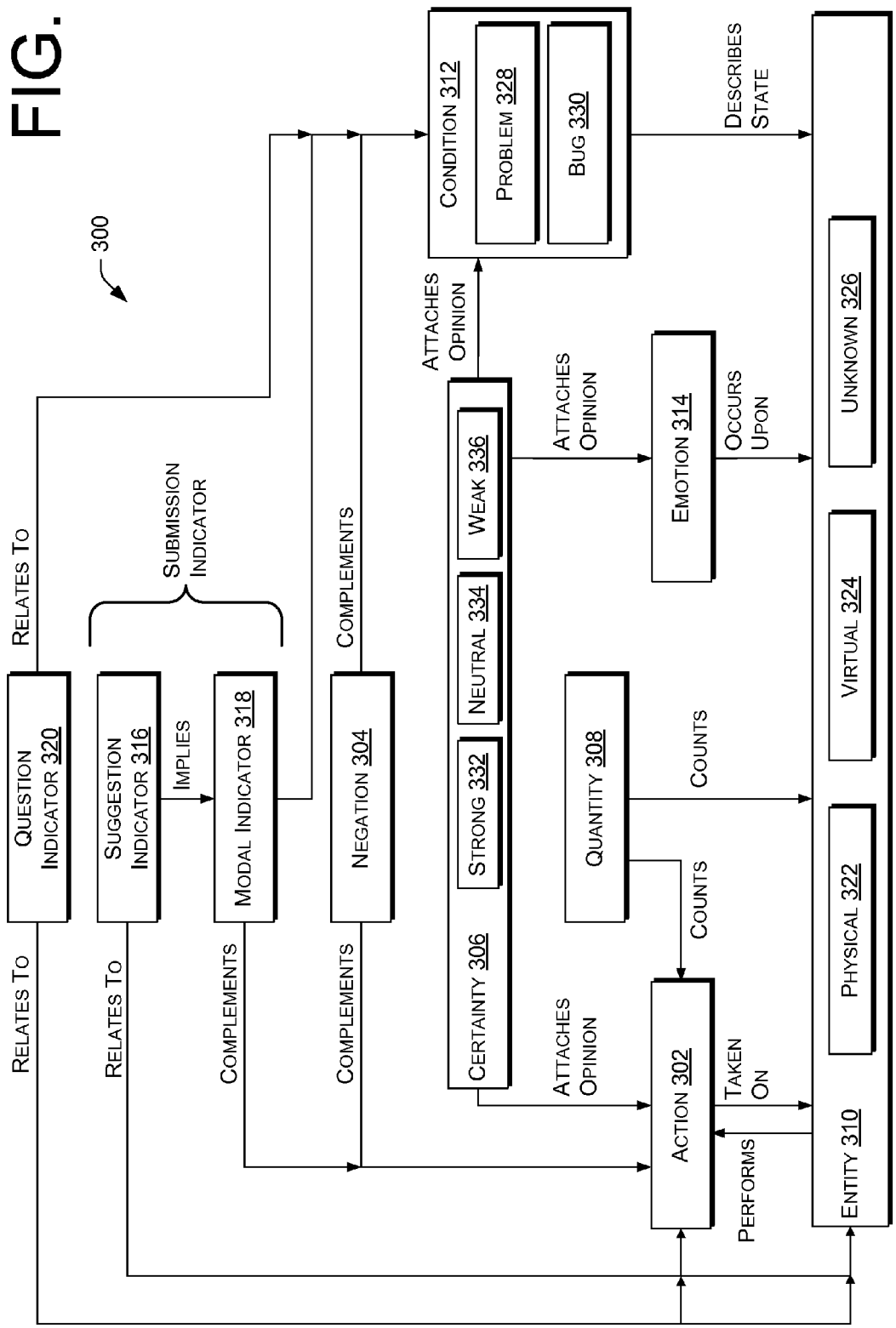
FIG. 3 illustrates an example ontology model.

The mapping module 122 may additionally map information to an ontology model. Data for the ontology model may be stored in an ontology model data store 130. An ontology model may include various classes and/or subclasses, where each class or subclass corresponds to one or more words or phrases. For ease of discussion, a subclass may often be referred to as a class. The ontology model may be constructed to relate the various classes. That is, the ontology model may be used to express relationships between different classes. The relationships may represent valid interactions between classes of the ontology model. An ontology model may be built by individuals, automatically without user input, any combination, or otherwise. An example ontology model is shown in FIG. 3. Further, example ontology models are discussed in U.S. application Ser. No. 13/535,366, entitled "Problem Inference from Support Tickets," filed on Jun. 28, 2012, and U.S. Application entitled "Analysis of User Text," filed concurrently herewith, both of which are incorporated herein by reference.

To map information to an ontology model, the mapping module 122 may map a class of a semantic hierarchy to one or more classes of an ontology model. In returning to the illustration above where a class representing a user interface entity is identified for a user phrase of "split screen," the mapping module 122 may map the class for user interface entity to a class of an ontology model, such as a class representing an entity. A class of a semantic hierarchy may be mapped to a same type of class of the ontology model (e.g., entity classes in semantic hierarchy are mapped to entity classes of an ontology model, action classes in semantic hierarchy are mapped to action classes of an ontology model, problem classes of semantic hierarchy are mapped to problem classes of an ontology model, etc.). To map a class of a semantic hierarchy to a class of an ontology model, the mapping module 122 may utilize an ontology dictionary, which may include a trie or other data structure mapping individual semantic hierarchy classes to the ontology model. An ontology dictionary may be specific to a domain and may define one or more ontology classes for a particular semantic hierarchy class. In one example, an ontology dictionary defines a mapping for each root node in a semantic hierarchy (e.g., top level node) to a class of an ontology model. In other examples, internal nodes (e.g., nodes at lower levels) may additionally, or alternatively, have a mapping to the ontology model. In some instances, an ontology dictionary may include a whitelist of classes that map to an ontology model and a blacklist of classes that do not map to the ontology model (e.g., classes that are filtered out while mapping to the ontology model, since they may not be useful for understanding input). In one illustration, an ontology dictionary may define that a semantic hierarchy entity node for "Account Experience" may map to a class "Entity" or a subclass "Virtual Entity" of an ontology model. An ontology dictionary may be defined by a user, application, or otherwise. In some instances, words or phrases may be mapped to an ontology model to represent a relationship between the words or phrases (e.g., so that user input of "my account is crashing" would be mapped to an entity ("account") and a problem ("crashing") and the ontology model describes a relationship of the entity to the problem).

The feedback analysis module 124 may process user feedback based on a mapping performed by the mapping module 122. For example, the feedback analysis module 124 may tag words or phrases of user feedback with respective classes of an ontology model (or a semantic hierarchy). The tagged user feedback may then be matched to a grammar pattern to identify a concept of the user feedback. The concept may be associated with the user feedback. A concept may be an abstraction that is defined by a grammar pattern (e.g., a sequence of components defined by order and/or proximity). As such, a concept may include a sequence of classes of an ontology model. A concept may include a problem, suggestion, question, action, activity, and so on. Note that these concepts may be distinguishable from classes of an ontology model.

A problem concept may identify an entity (e.g., operating system, hard drive, etc.) and an associated state, condition, or symptoms for the entity that is generally negative (e.g., crashing, defective, etc.). A symptom may include a symptom of a problem. Example grammar patterns for identifying a problem concept may be as follows:

Entity (e.g., ReplaceableEntity, VirtualEntity, MaintenanceEntity, etc.) preceded/followed by ProblemCondition
ProblemCondition/Condition/Negation .* Action, where ".*" denotes a regular expression that any number of characters can be present in-between (e.g., Negation and Action)

For example, consider a sentence "The device was faulty" which can be tagged with ontology classes by the feedback analysis module 124 as "The (device)/ReplaceableEntity was (faulty)/ProblemCondition." Here, the feedback analysis module 124 can match the tagged sentence to the problem grammar pattern above because a device (e.g., a ReplaceableEntity) is followed by the word faulty, which indicates a ProblemCondition. As another example, the sentence "OneDrive is crashing" would be tagged as "(OneDrive)/Entity is (crashing)/ProblemCondition." As such, the sentence would be associated with a problem concept. As used herein, ".*" represents zero or more instances of any element, e.g., a character or word (e.g., excluding newlines).

A suggestion concept may identify an entity and an associated state, condition, or symptom for improvement of the entity (e.g., a user suggestion regarding improvement of hardware or software, such as "make it more reliable, "allow font sizes of 6.14 points," etc.). Example grammar patterns for identifying a suggestion concept can be as follows:

(.*(Modal Indicator.*Action/Suggestion Indicator).*) preceding or following Entity
Submission Indicator preceding or following Entity
(Submission Indicator preceding or following Entity) followed by Action A question concept may identify a question and an associated condition. An example grammar pattern for identifying a question concept can be as follows:

Question Indicator preceding or following Action
Question Indicator preceding or following ProblemCondition An activity concept may identify steps performed on an entity, such as during troubleshooting of a problem or otherwise. For example, an activity concept may include pinging a network device, checking and cleaning cables, verifying device configuration, etc. An example grammar pattern for identifying an activity concept can be as follows:

Entity (e.g., ReplaceableEntity, VirtualEntity, MaintenanceEntity, etc.) preceded or followed by Action (e.g., MaintenanceAction)

For example, consider the sentence "Check device connectivity and clean the fiber." This sentence can be tagged by the feedback analysis module 124 as "(Check)/MaintenanceAction (device)/ReplaceableEntity connectivity and (clean)/MaintenanceAction the (fiber)/ReplaceableEntity." Here, the feedback analysis module 124 matches the tagged sentence to the activity grammar pattern above because instances of MaintenanceAction precede/follow instances of ReplaceableEntity in the sentence. In other words, two Activity concepts are identified in the sentence based on the sequences of ontological classes.

An action concept may identify actions performed on or by (or to be performed on or by) an entity, e.g., to improve or alter the state of the entity, such as rebooting a computer, restarting an application, etc. For example, an action concept may include rebooting a switch, replacing a line card, reseating a power supply, initiating a return merchandise authorization (RMA) for a load balancer, etc. An example grammar pattern for identifying an action concept can be as follows:

Entity (e.g., ReplaceableEntity, VirtualEntity, MaintenanceEntity, etc.) preceded or followed by Action (e.g., PhysicalAction)

For example, consider the sentence "An RMA was initiated for the load balancer." This sentence can be tagged by the feedback analysis module 124 as "An (RMA)/PhysicalAction was initiated for the (load balancer)/ReplaceableEntity." Here, the feedback analysis module 124 can match the tagged sentence to the Activity grammar pattern above because an instance of a Physical Action (RMA) precedes an instance of a ReplaceableEntity (load balancer).

Although various example concepts and grammar patterns are discussed herein, any type of concept or grammar pattern may be used. For example, other concepts may be defined to be associated with other grammar patterns.

The feedback analysis module 124 may identify actionable items from concepts of user feedback. User feedback may be identified as including an actionable item when a particular type of concept is associated with the user feedback. An actionable item may generally include a problem concept, a suggestion concept, a question concept, or other concept that may require attention of a user (e.g., administrator). For example, if the feedback analysis module 124 determines that a sentence is associated with a problem concept, the feedback analysis module 124 may determine that the sentence relates to an actionable item (e.g., a problem). To illustrate, a sentence that states "These account settings are confusing" may be associated with a problem for an account entity (e.g., problem concept—(account settings)/Entity followed by (confusing)/ProblemCondition). Here, the sentence is flagged as including an actionable item so that an administrator of the account settings may address the problem.

When an actionable item is identified for user feedback, the feedback analysis module 124 may also identify a type of the actionable item. The type of the actionable item may generally be identified from a mapping of the user feedback to one or more semantic hierarchies. The type of the actionable item may be a class that is identified in a semantic hierarchy for the user feedback. For example, the type of actionable item may be a class that represents an entity state for the user feedback (e.g., a class related to a problem, suggestion, question, action, activity, etc.). In returning to the illustration above with the sentence of "These account settings are confusing," the feedback analysis module 124 may map the term "confusing" to a "usability problem" node in a semantic hierarchy. As such, the actionable item for the sentence may be of type "usability problem" (for the corresponding node that is identified in the semantic hierarchy).

The feedback routing module 126 may provide information regarding an analysis of user feedback. The feedback routing module 126 may generally generate information for output (e.g., for presentation) and/or route the information to an individual (e.g., make the information available, send the information to a particular individual or computing device, etc.). For instance, the feedback routing module 126 may generate information regarding an actionable item for user feedback and provide that information to the device 106 for display via a user interface 132 of the device 106. The individual 108 may evaluate the user feedback based on the information and, in some instances, perform a task to address the actionable item, such as fixing a bug, implementing a new feature, answering a question, etc. In some instances, the feedback routing module 126 may provide information that enables an individual to understand an actionable item of user feedback without having to review the actual text of the user feedback (e.g., without providing the actual text). In other instances, the feedback routing module 126 may provide the text of the user feedback so that the individual may read what was said. Further, the feedback routing module 126 may provide information via a user interface (e.g., dashboard, Graphical User Interface (GUI), etc.), browser, application (e.g., mobile application, desktop application, etc.), a message (e.g., email, text message, Instant Message (IM), post to an online site, etc.), a telephone call, or otherwise. Example information that may be generated and/or provided by the feedback routing module 126 includes:

- Information identifying a concept of user feedback, an actionable item of user feedback, an entity associated with the actionable item, a type of the actionable item, and so on. In one example, assume a sentence that states "These account settings are confusing" is mapped to a "usability problem" node in a semantic hierarchy (e.g., "confusing" is mapped to "usability problem"). Here, information may be provided identifying a usability problem for a particular entity, namely an account settings entity. This may allow an administrator of the account settings to address the problem. Further, this may provide the administrator with information about the context of the user feedback (e.g., the type of problem, an entity associated with the problem, etc.).
- A ranking of information, such as actionable items (e.g., across a particular entity, across multiple entities, etc.), etc. The rankings may be output in various forms, such as charts, graphs, heat maps, or other visualizations. For example, based on analysis of multiple documents related to user feedback, the feedback routing module 126 may rank problems that are identified from the analysis for a particular application. If, for instance, a problem with account login occurs more frequently than a problem with message creation in an email application, the account login problem may be ranked higher in a list than the message creation problem. In another example, multiple documents may be analyzed to identify a top suggested feature across all entities (e.g., software, hardware, etc.) of an organization. This may allow an individual that is associated with the organization to implement a most commonly occurring suggestion. In yet another example, various hardware items may be ranked according to a number of problems that are identified for the hardware items (e.g., rank a game console higher than a keyboard, since the game console has more problems). In a further example, shown in the architecture 100 of FIG. 1, a chart is presented via the user interface 132 that shows a number of occurrences of problems for a particular entity, namely a software application called "ABC." Here, the chart shows that account experience problems (e.g., logging in, account management, etc.) occur more frequently than usability problems (e.g., interface is confusing, functions are annoying, etc.) and connectivity problems (e.g., connecting to a network).
- Information indicating a priority of an actionable item. The priority may be indicated in a variety of manners, such as a score on a scale (e.g., from 1 to 10), different levels (e.g., yellow, orange, red, etc.), and so on. In one example, the feedback routing module 126 may inform an individual that a problem with a software element has occurred more than a threshold number of times or that the problem is a highest ranked problem for the software element. As such, the individual may be informed that the problem has a relatively high priority. In another example, the feedback routing module 126 may provide information regarding a particular type of problem that is flagged to be associated with a relatively high level of priority (e.g., provide an alert that a particular security problem with an email application has been identified).

The above description provides just a few examples of the many possible types of information that may be generated and/or provided regarding an analysis of user feedback. Further, any type of information may be combined in any manner.

The feedback routing module 126 may provide information regarding user feedback to individuals in a variety of manners. In some instances, information for user feedback may be assigned to an individual that manages an entity that is identified in a semantic hierarchy for the user feedback. The individual may generally be associated with a class of a semantic hierarchy (e.g., an entity class or entity state class). To illustrate, suppose that user feedback states "Account settings is confusing," and "account settings" is mapped to an "account experience" node for an entity in a semantic hierarchy. If a particular administrator is assigned to manage the "account experience" entity class (e.g., manages user accounts including settings, passwords, etc.), the particular administrator may receive a notification regarding the problem. This may allow the individual to fix the problem. As such, the feedback routing module 126 may provide bug assignment functionality. Further, in some instances the feedback module 126 may provide information regarding user feedback to any individual that requests the information (or application that requests the information). To illustrate, an executive of a company may request information regarding actionable items that are associated with a particular software application.

Additionally, or alternatively, the feedback routing module 126 may notify end-users that generated user feedback about an analysis of the user feedback. A user may be notified that the user feedback has been received, the user feedback is being processed, the user feedback has been processed and assigned to an individual for review, an identified entity of the user feedback has been updated (with a new feature, to fix a problem, etc.). In returning to the above illustration where the user feedback states "Account settings is confusing," the feedback routing module 126 may send a message to a user that provided the feedback to let the user know that the problem has been assigned to an individual that manages account settings.

Although the feedback data store 118, the hierarchy data store 128, and the ontology model data store 130 are illustrated as being part of the service provider 102, in some instances any of these data stores may be located elsewhere, such as remotely to the service provider 102.

As noted above, the architecture 100 of FIG. 1 may include the device 106 to perform various operations. The device 106 may comprise any type of computing device, such as a laptop computer, a desktop computer, a server, a smart phone, an electronic reader device, a mobile handset, a personal digital assistant (PDA), a portable navigation device, a portable gaming device, a tablet computer, a watch, a portable media player, a wearable computing device (e.g., a watch, an optical head-mounted display (OHMD), etc.), a television, a computer monitor or display, a set-top box, a computer system in a vehicle, an appliance, a camera, a robot, a hologram system, a security system, a thermostat, a smoke detector, an intercom, a home media system, a lighting system, a heating, ventilation and air conditioning (HVAC) system, a home automation system, a projector, an automated teller machine (ATM), and so on. In some instances, the device 106 may comprise a mobile device, while in other instances the device may be a stationary device.

As illustrated in FIG. 1, the device 106 may be equipped with one or more processors 134, memory 136, and one or more interfaces 138 (e.g., a network interface, display device interface, etc.). The device 106 may also include other components, such as a speaker(s), a display(s) (e.g., touch screen, etc.), a camera(s), a microphone(s), etc. The one or more processors 112 may include a central processing unit (CPU), graphics processing unit (GPU), a microprocessor, and so on.

The memory 136 may include a client application 140 that facilitates various operations on the device 106. For example, the client application 140 may output content (e.g., display the user interface 132), receive input from the individual 108, communicate with the service provider 102 (e.g., to receive information regarding an analysis of user feedback), and so on.

The memory 114 and/or 136 (and/or any other memory described herein) may include one or a combination of computer-readable media. Computer-readable media described herein include computer storage media and/or communication media. Computer storage media includes tangible storage units such as volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Example Semantic Hierarchies

Figure 2:
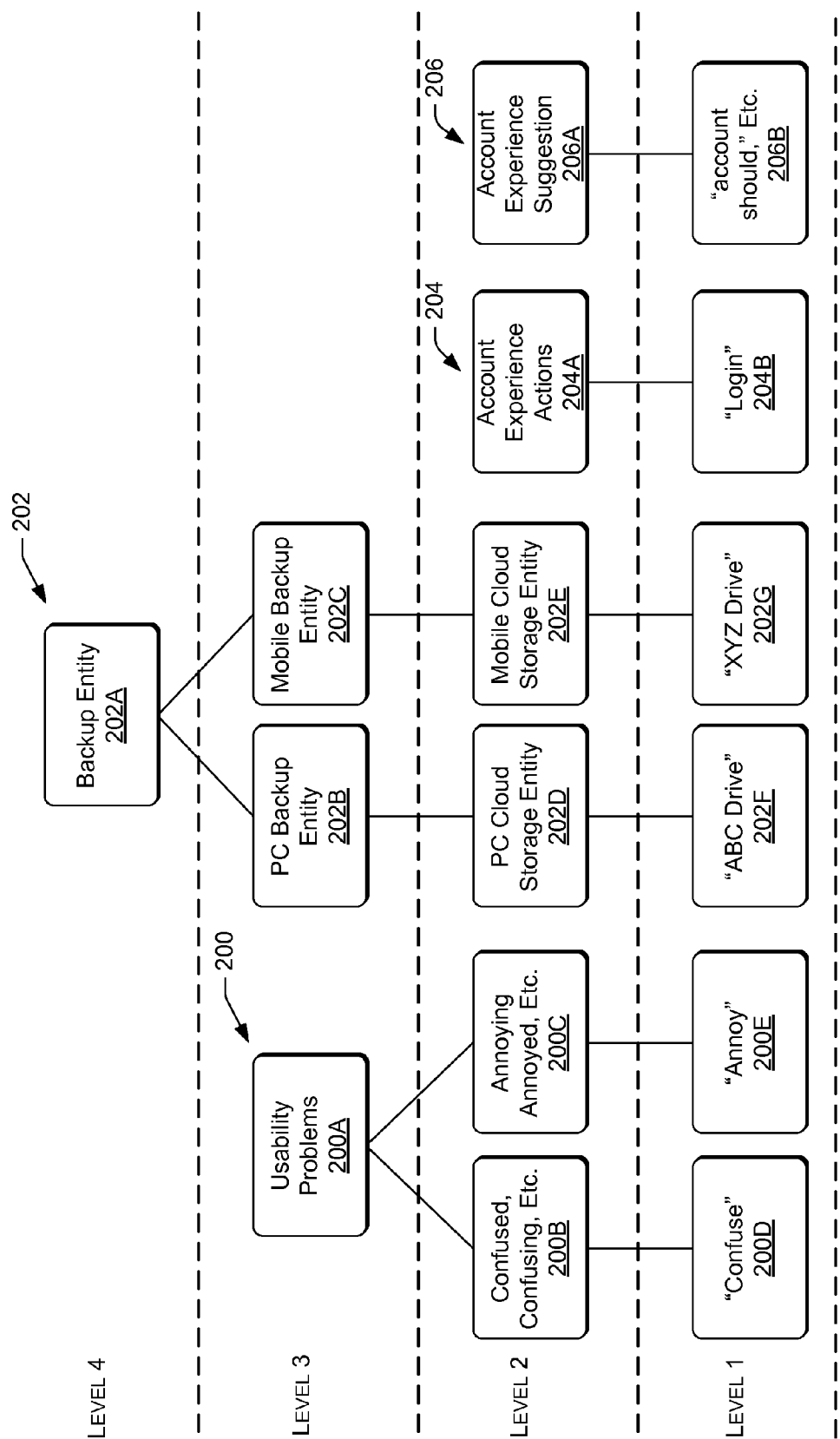
FIG. 2 illustrates example semantic hierarchies.

FIG. 2 illustrates example semantic hierarchies 200, 202, 204, and 206. Each of the semantic hierarchies 200-206 may include nodes at different levels. Each node is represented with a box to represent a class (e.g., node 200A represents a class for usability problems). Each level may represent a different level of abstraction or meaning. In some instances, a level may group nodes of a lower level (e.g., node 200A associates nodes 200B and 200C (and the nodes below that, nodes 200D and 200E)). In other instances, a level may represent a level of abstraction of a single node of another level (e.g., node 200B provides a different level of abstraction for node 200D). Here, Level 1 may relate to customer terms (e.g., the words or phrases end-users might use). Level 2 may relate to lexical or morphological forms or other forms of the customer terms or technical terms for the customer terms. Although in other instances Level 1 may include morphological forms and Level 2 may relate to technical terms. A morphological form of a term may include a stem of a term plus any endings (suffixes) of the stem (e.g., for a stem of "confuse"—"confusing," "confused," "confuses," "confusion," etc.). Meanwhile, a technical term may generally relate to technology and/or be used more frequently by a particular group of individuals (in comparison to a corresponding end-user term). For example, when referring to a particular software feature that includes multiple displayed windows, an end-user might use the phrase "split windows," whereas an administrator of the software might use the more technical phrase of "divided screen view." Although Level 2 in this example relates to morphological forms and technical terms, in some instances there may be separate levels for morphological forms and technical terms. In this example, Levels 3 and 4 relate to different groupings or levels of abstraction. For example, an administrator may have selected to group nodes 200B and 200C, resulting in the creation of node 200A at Level 3. The different levels may allow a word or phrase to be transformed from one level of meaning or abstraction to another (from one class to another). Here, Level 1 may correspond to a lowest level in any given semantic hierarchy.

The example semantic hierarchies 200-206 represent a few of a multitude of semantic hierarchies that might exist. The semantic hierarchies 200-206 are provided for illustrative purposes and may include additional nodes or be arranged in different manners. For example, the semantic hierarchy 202 may include additional nodes at Level 3 that relate to game console backup entities, server backup entities, and so on. Furthermore, although a word or phrase may be illustrated within a particular semantic hierarchy, the word or phrase may additionally, or alternatively, be included in other semantic hierarchies.

As noted above, different types of semantic hierarchies may exist. In some instances, a semantic hierarchy is classified into either an entity hierarchy or an entity state hierarchy. An entity hierarchy may include nodes that represent entity classes, such as the semantic hierarchy 202 which includes nodes that represent various entity classes (e.g., PC Backup, Mobile Backup, PC Cloud Storage, Mobile Cloud Storage, etc.). Meanwhile, an entity state hierarchy may include nodes that represent a state of an entity. In FIG. 2, the semantic hierarchies 200, 204, and 206 may be referred to as entity state hierarchies.

In some instances, individuals may be assigned to different nodes of a semantic hierarchy. This may allow user feedback to be mapped to a designated individual for evaluation (e.g., bug assignment, suggestion assignment, question assignment, etc.). For example, in the semantic hierarchy 202, node 202D may be associated with an administrator that manages PC Cloud Storage. If user feedback is mapped to node 202D, the administrator over PC Cloud Storage may receive information regarding the user feedback. An individual may be associated with any node at any level in a semantic hierarchy. That is, an individual may be associated with an entity node (e.g., node 202D) and/or an entity state node (e.g., node 200A) at any level. This association may be configurable. For example, an organization may define that entity nodes from level 2 above may be associated with individuals, while entity states nodes may not be associated with individuals. The organization may further designate individuals for the entity nodes.

As one example of mapping user feedback to a semantic hierarchy, assume that the user feedback states "This ABC Drive is really confusing. First, I login to ABC Drive . . . . I think the account should let me change my photo," where "ABC Drive" represents a product name for cloud backup product. Here, the sentence "This ABC Drive is really confusing" would be mapped to the semantic hierarchies 200 and 202 as follows: "This (ABC Drive)/node 202F is really (confusing)/node 200D." By mapping "ABC Drive" to node 202F, "ABC Drive" may also be mapped to nodes 202D, 202B, and 202A, which are part of a chain for the node 202F. As such, "ABC Drive" may be mapped to PC Cloud Storage Entity, PC Backup Entity, and Backup Entity. Similarly, "confusing" may be mapped to nodes 200D, 200B, and 200A. Further, the second sentence "First, I login to ABC Drive" may be mapped as follows: "First, I (login)/ (nodes 204B and 204A) to (ABC Drive)/(nodes 202F, 202D, 202B, and 202A)." Moreover, the last sentence "I think the account should let me change my photo" may be mapped as follows: "I think the (account should)/(nodes 206B and 206A) let me (change)/(action node not illustrated in FIG. 2) my (photo)/(entity node not illustrated in FIG. 2)."

The mappings may be used to perform various functions. In some instances, each of the mapped sentences may be mapped to an ontology model. For example, the mapped sentence "This (ABC Drive)/node 202F is really (confusing)/node 200D" may be mapped to corresponding entity and entity state nodes of the ontology model as follows: "This (ABC Drive)/(entity node) is really (confusing)/(entity state node of ProblemCondition)." The mapped sentence to the ontology model may then be matched to a grammar pattern to identify a concept of the sentence. In this example, the sentence may relate to a problem concept (due to entity preceding a ProblemCondition). The other sentences of the user feedback may also be mapped to the ontology model and matched to a grammar pattern in similar fashion.

In some instances, if a concept of a sentence relates to an actionable item (e.g., a problem, suggestion, or question), the sentence may be provided to an individual for evaluation. Information about the sentence may be provided to a designated individual that manages particular information, provided to any individual that requests the information, and so on. In one illustration, the first sentence ("This ABC Drive is really confusing" that relates to a problem with the "ABC Drive") may be assigned to an individual that manages the "ABC Drive" so that the problem may be addressed. The individual may be selected by identifying an individual that is associated with an entity node for the mapped sentence. As an example, node 202D may be selected from the chain for the phrase "ABC Drive." If multiple individuals are identified (e.g., due to associations to individual at different levels of a semantic hierarchy), then a rule-based approach may be used. For example, a rule may be defined so that (i) an individual associated with a lowest node in a hierarchy (or alternatively a highest node) is selected, an individual from an entity node is selected (in the case where an entity node and an entity state node are each associated with an individual), all individuals that are associated with nodes are selected (e.g., route information to each individual of a semantic hierarchy), and so on. Further, in another illustration of providing information to an individual for evaluation, the information may be provided upon request. For example, an individual may send a request to view a top number of problems (or all problems) that are classified as related to "PC Backup" (e.g., are associated with node 202B). In response to the request, information about the top number of problems (or all problems) with "PC Backup" may be provided.

Example Ontology Model

FIG. 3 shows an example ontology model 300 that may be used for performing various operations described herein. The ontology model 300 includes interconnected classes or hierarchies of classes. In some implementations, classes and subclasses in the ontology model 300 are defined and arranged in a taxonomy, as represented by nested blocks in FIG. 3. Labels on connectors indicate syntactical or grammatical interactions that are considered valid between the connected classes. Example classes that can be used in an ontology model are set forth in Table 1. Words or phrases corresponding to specific classes or subclasses of the ontology model 300 are referred to as "instances" of those classes or subclasses.

TABLE 1

| Ontology Class | Describes |
| --- | --- |
| Entity | Thing that exists |
| Action | Behavior that can be caused or carried out upon, using, or by an entity |
| Condition | Describes the state of an entity |
| Quantity | Describes the quantity of an entity/action |
| Negation | Negates a word or phrase |
| Certainty | Adds strength/weakness to a phrase |
| Emotion | Feelings or beliefs held by the writer of the user text |
| Suggestion Indicator | Indicates that associated portion(s) of the user text represent suggestions, e.g., regarding items such as software or hardware |
| Modal Indicator | Indicates that an associated Action in the user text is hypothetical or desirable. |
| Question Indicator | Words or phrases used to elicit information |

The ontology model 300 can be constructed to relate the various ontology classes and subclasses according to defined interactions, and can be stored in a knowledge base. For example, individual phrases appearing in a document(s) can be mapped to the classes of the ontology model 300. The mapping of the phrases to the ontology model 300 can be stored in the knowledge base.

The ontology model 300 can be used to express relationships between the different classes, which can provide for concise expression of pertinent information. Each class or subclass can have mapped to it one or more phrases and can correspond to some information provided by a document. In some implementations, a domain expert or other individual can select the particular class/subclass for each phrase, possibly assisted by a tool and/or partial automation.

The ontology model 300 can include one or more of the classes from Table 1, e.g., Entity, Actions, Condition, Incident, Quantity, Negation, Certainty, Emotion, Suggestion Indicator, Modal Indicator, and Question Indicator. Each class is represented by a corresponding block in FIG. 3, e.g., action class 302, negation class 304, certainty class 306, quantity class 308, entity class 310, condition class 312, emotion class 314, suggestion-indicator class 316, modal-indicator class 318, and question-indicator class 320. As illustrated by the nested blocks, any particular class and its subclasses can be represented as trees or graphs of nodes in a taxonomy for that class.

Arrows and labels in FIG. 3 graphically represent relationships between individual classes consistent with the ontology model 300. These relationships represent valid interactions between the ontology classes. For example, an action "taken" on an entity is a valid interaction according to the ontology model 300, as shown by the arrow connecting the action class 302 to the entity class 310. Conversely, an action "taken" on a condition would not be a valid interaction according to the ontology model 300 since there is no corresponding arrow illustrating such a relationship between the action class 302 and the condition class 312.

The Entity class 310 can correspond to words or phrases that represent an entity, e.g., a thing that exists in a real or virtual sense. In some examples, the entity can be a technical entity, such as a technical word or phrase. Examples include product names such as "XBOX®," "PLAYSTATION®," "LINUX®," and "WINDOWS®," component names such as "hard drive," and service names such as "cloud service." The entity class can include subclasses such as Physical-entity subclass 322 or Virtual-entity subclass 324. For example, a Physical Entity can be a tangible object such as an accelerometer, a gaming console. A Virtual Entity can be an intangible object such as a protocol, reference, variable, library, or method. Other examples of entities can include services, e.g., cloud services, and software entities.

In some examples, the Entity class 310 can have an "unknown-entity" subclass 326. The unknown-entity subclass 326 can be used in conjunction with sentences or other blocks of free-form user text that do not contain an identifiable entity. In some examples, the Entity class 310 can include subclasses such as a replaceable entity or a maintenance entity.

The Action class 302 can correspond to words or phrases that represent a behavior that is taken or carried out on or using an entity, or a behavior performed by an entity. Actions can include, e.g., behaviors a user is trying to accomplish with an entity or what a user expects an entity to do. Subclasses of the action class can include those that interact with an entity and/or alter the state of the entity, such as, for example, a Physical Action (e.g., replace, switch off, switch on, open, etc.), a Maintenance Action (e.g., update, upgrade, downgrade, etc.), a Troubleshooting Action (e.g., test or inspect), and/or a Virtual Action (e.g., install, wipe, copy, access, animate, build, change, navigate, etc.).

The Condition class 312 can correspond to words or phrases that describe the state of an entity, e.g., an entity can have a faulty condition such as "illegal reference." Example conditions can include problem conditions 328 (e.g., error, freeze, problem, difficult, etc.), or bug conditions 330 (e.g., representing software behavior determined to be faulty due to error in the software rather than in its environment).

The Quantity class 308 can correspond to words or phrases that count or describe the quantity of, e.g., an entity (e.g., two virtual desktops) or an action (e.g., clicked twice). Some implementations can use LowQuantity, MediumQuantity, and HighQuantity subclasses to distinguish phrases that reflect relatively low, moderate, and high quantities depending upon the context. A quantity can also be used to reflect severity, e.g., LowQuantity can correspond to a relatively minor or low volume incident whereas High-Quantity can correspond to a relatively major or high volume incident.

The Negation class 304 can correspond to words or phrases that negate one or more other words or phrases, e.g., "did not reinstall the prior version." The negation class can include a SyntheticNegations subclass that uses verbs or nouns to negate a condition, incident or action, e.g., phrases such as "absence of," "declined," "denied," and the like. The Negation class 304 can also include AnalyticNegations subclass that uses "not" to negate a condition, incident, or action.

The Certainty class 306 can correspond to words or phrases that represent confidence of the user regarding an entity, condition, or emotion represented in the free-form user text, e.g., by adding strength or weakness to a word or phrase. In the example sentence "I confirm that the keyboard shortcuts work," "confirm" can be associated with the certainty class 306. The certainty class 306 can include a StrongCertainty subclass 332, e.g., phrases such as "confirm" or "affirmative" that denote certainty or high confidence. The certainty class 306 can also include a Neutral-Certainty subclass 334, e.g., phrases such as "not sure." The certainty class 306 can also include a WeakCertainty subclass 336, e.g., phrases such as "unlikely" or "doubtful" that denote uncertainty or low confidence. Note that phases in the WeakCertainty subclass 336 can be phrases that may not explicitly indicate negative sentiment, but rather tend to be used by individuals when speculating about the nature of, e.g., a missing feature or unexpected behavior in software or hardware.

The Emotion class 314 can correspond to words or phrases that represent feelings or beliefs of the user writing the free-form user text. For example, in the sentence "MICROSOFT is great," "great" is an emotion the writer feels about the entity "MICROSOFT". Other example instances include "awesome," "lousy," "angry," "satisfied," etc.

The suggestion indicator class 316 can correspond to words or phrases that represent the presence of a suggestion. Example instances of the suggestion indicator class 316 can include, e.g., "allow," "enable, "improve," "make it possible," "please," "you should," "should," etc.

The modal-indicator class 318 can correspond to words or phrases, such as modal auxiliaries in English, that indicate that an associated Action 302 in the free-form user text is hypothetical or desirable. Example instances of modal-indicator class 318 can include, e.g., "it would be nice", "it would", "could," etc. In some examples, an instance of suggestion-indicator class 316, e.g., "you should," implies or includes a corresponding instance of modal-indicator class 318, e.g., "should." In some instances herein, the term "submission indicator" refers to an instance of suggestion-indicator class 316 or of modal indicator class 318, or any combination thereof The question-indicator class 320 can correspond to words or phrases used to elicit information, such as "what does this mean?" or "how does this work?" or "how to play wmv files?" or "where is Excel installed?" etc. The question class 320 can include words or phrases that relate to a question or query regarding an entity.

Other classes can be present. For example, a Property class can represent static, volatile, dynamic, or other properties of entities. A Privacy class can correspond to words or phrases that indicate a user's expectations or desires with respect to access to information or other entities, e.g., "personal" or "public."

Figure 4:
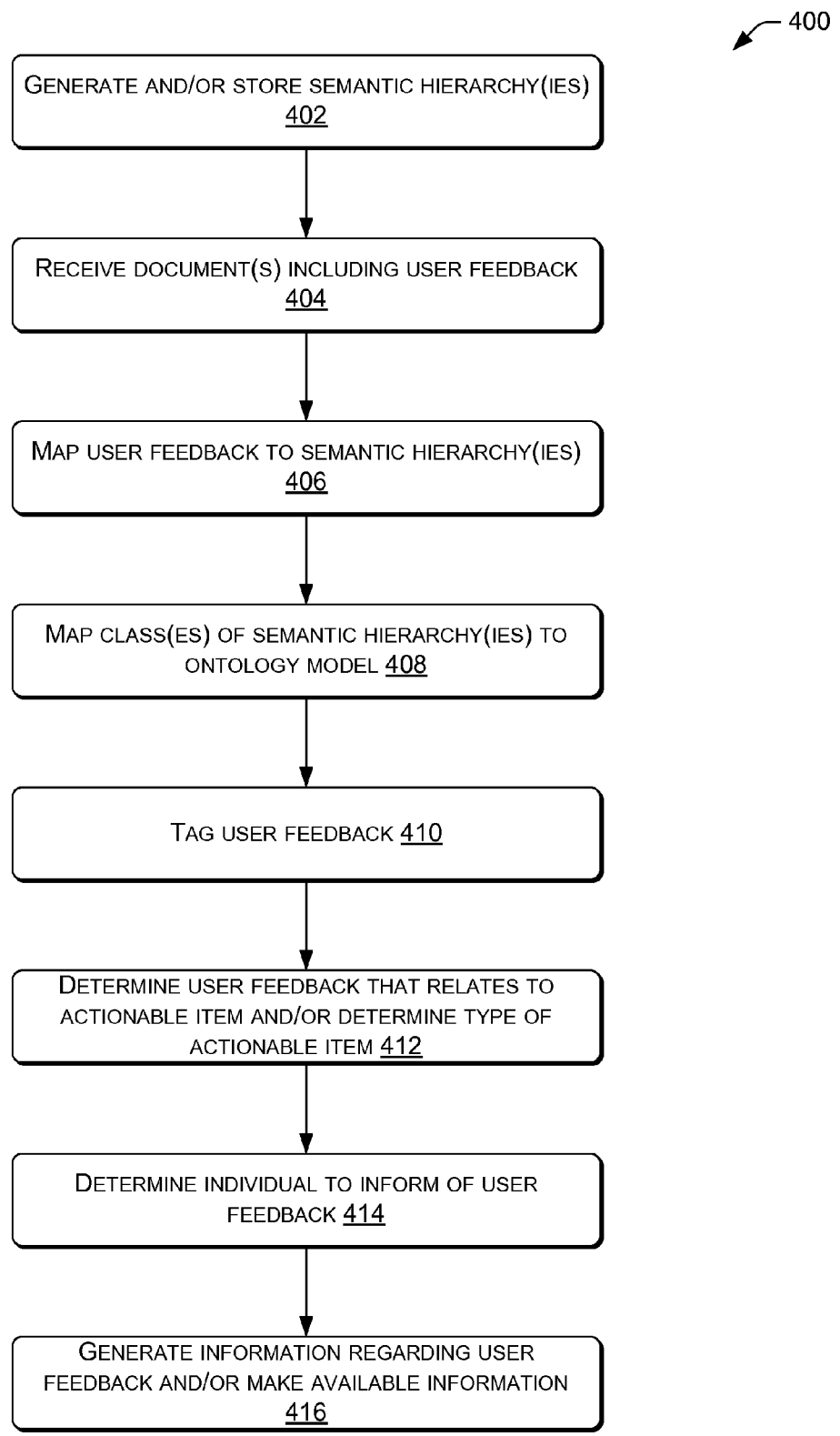
FIG. 4 illustrates an example process to generate one or more semantic hierarchies and/or utilize the one or more semantic hierarchies to process free-form text.
Figure 5:
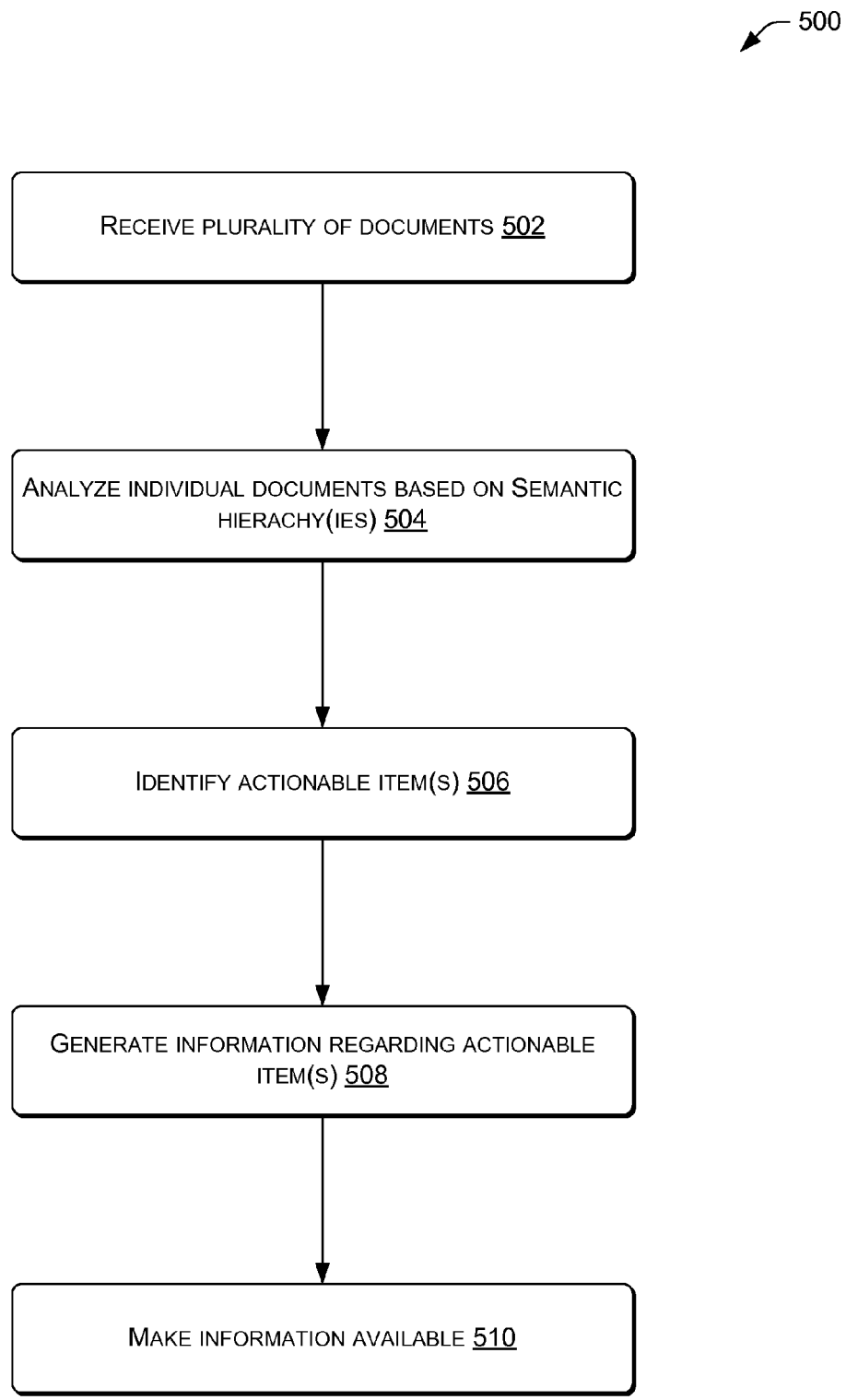
FIG. 5 illustrates an example process of analyzing documents and identifying actionable items.

A domain expert or other individual can assign specific words or phrases to one or more classes or subclasses of the ontology model 300. The ontology model 300 can be constructed to relate the various ontology classes and subclasses according to defined interactions and can be stored in a knowledge base Example Processes FIGS. 4 and 5 illustrate example processes 400 and 500 for employing the techniques described herein. For ease of illustration the processes 400 and 500 are described as being performed in the architecture 100 of FIG. 1. For example, one or more of the individual operations of the processes 400 and 500 may be performed by the service provider 102 and/or the device 106. However, the processes 400 and 500 may be performed in other architectures. Moreover, the architecture 100 may be used to perform other processes.

The processes 400 and 500 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, configure the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the individual operations may be omitted.

FIG. 4 illustrates the example process 400 to generate one or more semantic hierarchies and/or utilize the one or more semantic hierarchies to process user feedback.

At 402, the service provider 102 may generate and/or store one or more semantic hierarchies. Each semantic hierarchy may have multiple levels of nodes, with each node representing a class. For example, a semantic hierarchy may include a first level having at least one node representing customer terms, a second level having at least one node representing morphological forms of the customer terms or technical terms for the customer terms, a third level having at least one node that groups one or more nodes of the second level, and so on. A semantic hierarchy may generally relate to an entity hierarchy or an entity state hierarchy. For example, an entity hierarchy may include nodes that represent words or phrases that relate to a software or hardware entity, while an entity state hierarchy may include nodes that represent words or phrases that relate to a problem for the software or hardware entity or a suggestion for the software or hardware entity.

At 404, the service provider 102 may receive one or more documents including user feedback. The one or more documents may include a variety of feedback, such feedback provided via an operating system, feedback from an online source, feedback from a conversation with an agent, feedback provided via a customer support portal, feedback from an electronic message, feedback from an evaluation form, and so on. The user feedback may include free-form text that is generated by a user (e.g., one or more sentences in a natural language format).

At 406, the service provider 102 may map user feedback of a document to one or more semantic hierarchies. For example, the mapping may include mapping a word or phrase of the user feedback a lowest level in a semantic hierarchy (e.g., a node at a lowest level) and traversing the semantic hierarchy to determine a node at a higher level of the semantic hierarchy that corresponds to the node at the lowest level of the semantic hierarchy. This process may be repeated for individual words or phrases of user feedback. In some instances, the mapping (and subsequent processes) may be performed for the body of the user feedback, while in other instances the mapping (and subsequent processes) may be performed for a title or other parts of the user feedback.

At 408, the service provider 102 may map one or more classes of a semantic hierarchy to an ontology model. For example, the service provider 102 may map a node (that is identified for a word or phrase) of a particular level of a semantic hierarchy (e.g., a higher level node than Level 1) to a class of an ontology model. This may be repeated for individual words or phrases of user feedback.

At 410, the service provider 102 may tag user feedback. For example, a word or phrase of user feedback may be tagged with a class of the ontology model to which the word or phrase is mapped at the operation 408. That is, the word or phrase may be associated with a class of the ontology model. The word or phrase may also be tagged with a class from a semantic hierarchy.

At 412, the service provider 102 may determine user feedback that relates to an actionable item and/or determine a type of the actionable item. An actionable item may include a problem with an entity, a suggestion for improvement of an entity, a question regarding an entity, and so on. The service provider 102 may identify a grammar pattern of tagged user feedback. If the grammar pattern matches a grammar pattern associated with a particular concept (e.g., a problem, suggestion, question, etc.), the service provider 102 may determine that the user feedback relates to an actionable item. When an actionable item is identified, the service provider 102 may also determine a type of the actionable item based on a node to which a word or phrase of the user feedback is mapped in a semantic hierarchy. For example, the service provider 102 may identify an entity state node (or entity node) to which a word or phrase of the user feedback is mapped. The entity state node may identify, for example, a class of a problem, suggestion, or question.

At 414, the service provider 102 may determine an individual to inform of the user feedback. In one example, the service provider 102 may identify an entity node (or entity state node) to which a word or phrase of user feedback is mapped. The entity node may be associated with an individual for routing information about the user feedback. In another example, the service provider 102 may identify an individual that made a request for information about user feedback.

At 416, the service provider 102 may generate information regarding user feedback and/or make the information available. The information may indicate an actionable item, a type of the actionable item, a concept for user feedback, a ranking of an actionable item (based on occurrences of the actionable item within a plurality of pieces of user feedback), a ranking of entities (based on a number of actionable items associated with respective entities), a priority of an actionable item, and so on. The information may be provided to an individual that is assigned to handle a particular entity or particular type of actionable item. Alternatively, or additionally, the information may be provided to an individual that requested the information. Further, the information may be provided to applications, devices, and so on.

FIG. 5 illustrates the example process 500 of analyzing documents and identifying actionable items.

At 502, the service provider 102 may receive a plurality of documents. Individual ones of the plurality of documents may include free-form user text.

At 504, the service provider 102 may analyze individual ones of the plurality of documents based on one or more semantic hierarchies. Each of the one or more semantic hierarchies may have different levels of nodes for different classes of words or phrases.

At 506, the service provider 102 may identify actionable items for at least some of the plurality of documents based on the analysis. Individual ones of the actionable items may include a problem, a suggestion, or a question for an entity (e.g., software, hardware, etc.). The operation 506 may include identifying a node in a semantic hierarchy that is identified from the analysis that relates to a problem, suggestion, or question class.

At 508, the service provider 102 may generate information regarding at least some of the actionable items. In some instances, the generation may include ranking actionable items based on a number of occurrences of respective actionable items within the identified actionable items. Further, in some instances the generation may include generating displayable information.

At 510, the service provider 102 may make information available. For example, the information may be made available to a device to enable a user to evaluate an actionable item.

EXAMPLES

Example A, a system comprising: one or more processors; memory communicatively coupled to the one or more processors and storing data regarding a semantic hierarchy having one or more levels of nodes, with each node representing a class; an interface communicatively coupled to the one or more processors and configured to receive data including free-form text; a mapping module stored in the memory and executable by the one or more processors to map at least one word or phrase of the data to one or more levels of the semantic hierarchy; and a feedback routing module stored in the memory and executable by the one or more processors to utilize the mapped at least one word or phrase of the data to send information regarding the data to a device associated with an individual for evaluation of the actionable item.

Example B, the system of example A, wherein the semantic hierarchy includes: a first level having at least one node representing customer terms; and a second level having at least one node representing at least one of morphological forms of the customer terms or technical terms for the customer terms.

Example C, the system of example A or B, wherein the actionable item includes at least one of a problem with a software or hardware entity, a suggestion for improvement of the software or hardware entity, or a question regarding a software or hardware entity.

Example D, the system of any of examples A-C, wherein the data includes feedback that is provided via an operating system, feedback from an online source, feedback from a conversation with an agent, feedback provided via a customer support portal, feedback from an electronic message, or feedback from an evaluation form.

Example E, the system of any of examples A-D, wherein the mapping module is configured to: map the at least one word or phrase of the data to the semantic hierarchy by mapping the at least one word or phrase to a node at a first level in the semantic hierarchy and determining a node at a second level of the semantic hierarchy that corresponds to the node at the first level of the semantic hierarchy; and map the node at the first or second level of the semantic hierarchy to a class of an ontology model.

Example F, the system of any of examples A-E, further comprising: a feedback analysis module stored in the memory and executable by the one or more processors to: tag the at least one word or phrase of the data with the class of the ontology model; and determine that the data relates to the actionable item based at least in part on a grammar pattern of the tagged data, the actionable item including at least one of a problem with a software or hardware entity, a suggestion for improvement of the software or hardware entity, or a question regarding the software or hardware entity.

Example G, the system of any of examples A-F, wherein: the feedback analysis module is configured to determine a type of the actionable item based at least in part on the mapped at least one word or phrase of the data; and the feedback routing module is configured to send information to the device associated with the individual regarding the type of the actionable item.

Example H, a method comprising: generating, by a computing device, an entity hierarchy having nodes that represent classes for an entity and an entity state hierarchy having nodes that represent classes for a state of the entity, each of the entity hierarchy and the entity state hierarchy including different levels of nodes; receiving, by the computing device, user feedback including free-form text; mapping, by the computing device, a first word or phrase of the user feedback to the entity hierarchy and mapping a second word or phrase of the user feedback to the entity state hierarchy; determining, by the computing device, that the user feedback relates to an actionable item for a software or hardware entity; determining, by the computing device, an individual to inform of the user feedback based on at least one of the mapped first word or phrase to the entity hierarchy or the mapped second word or phrase node to the entity state hierarchy; and making available information regarding the user feedback to a device associated with the individual to evaluate the actionable item.

Example I, the method of example H, wherein at least one of the entity hierarchy or the entity state hierarchy includes a first level having at least one node representing customer terms, and a second level having at least one node representing at least one of morphological forms of the customer terms or technical terms for the customer terms.

Example J, the method of example H or I, wherein the entity hierarchy includes nodes that represent words or phrases that relate to the software or hardware entity and the entity state hierarchy includes nodes that represent words or phrases that relate to at least one of a problem for the software or hardware entity, a suggestion for the software or hardware entity, or a question regarding the software or hardware entity.

Example K, the method of any of examples H-J, wherein: the mapping includes mapping the first word or phrase to a node in the entity hierarchy and mapping the second word or phrase of the user feedback to a node in the entity state hierarchy; and the method further comprises: determining a type of the actionable item based on at least one of the node to which the first word or phrase is mapped in the entity hierarchy or the node to which the second word or phrase is mapped in the entity state hierarchy; and sending information to the device associated with the individual regarding the type of the actionable item.

Example L, the method of any of examples H-K, wherein the actionable item includes a problem with the software or hardware entity, a suggestion for improvement of the software or hardware entity, or a question regarding the software or hardware entity.

Example M, the method of any of examples H-L, wherein: the mapping includes: mapping the first word or phrase of the user feedback to a node at a lowest level in the entity hierarchy and traversing the entity hierarchy to a node at the higher level of the entity hierarchy; and mapping the second word or phrase to a node at a lowest level in the entity state hierarchy and traversing the entity state hierarchy to a node at the higher level of the entity state hierarchy; and the method further comprises: mapping the node at the higher level of the entity hierarchy to a first class of an ontology model and mapping the node at the higher level of the entity state hierarchy to a second class of the ontology model; tagging the first word or phrase of the user feedback with the first class of the ontology model and tagging the second word or phrase of the user feedback with the second class of the ontology model; and determining that the user feedback relates to at least one of the problem, the suggestion, or the question for the software or hardware entity based at least in part on a grammar pattern of the tagged user feedback.

Example N, the method of any of examples H-M, wherein the user feedback includes one or more sentences in a natural language format.

Example O, the method of any of examples H-N, further comprising: ranking the actionable item associated with the user feedback with respect to actionable items of other user feedback based at least in part on occurrences of the actionable item within a plurality of pieces of user feedback; and making available information regarding the ranking to the device associated with the individual.

Example P, one or more computer-readable media storing computer-executable instructions that, when executed by the one or more processors, cause the one or more processors to perform acts comprising: receiving a plurality of documents, individual ones of the plurality of documents including free-form user text; analyzing individual ones of the plurality of documents based at least in part on one or more semantic hierarchies that each have different levels of nodes for different classes of words or phrases; identifying actionable items for at least some of the plurality of documents based at least in part on the analysis, individual ones of the actionable items including a problem, a suggestion, or a question for software or hardware; generating information regarding at least some of the actionable items; and making the information available to evaluate at least some of the actionable items.

Example Q, the one or more computer-readable media of example P, wherein the identifying the actionable items includes identifying, for individual ones of at least some of the plurality of documents, a node in the one or more semantic hierarchies that is identified from the analysis that relates to a problem, suggestion, or question class.

Example R, the one or more computer-readable media of example P or Q, wherein the generating the information includes: generating information that identifies a particular actionable item that occurs most frequently, within the identified actionable items, for a particular software or hardware entity.

Example S, the one or more computer-readable media of any of examples P-R, wherein the generating the information includes: ranking at least some of the actionable items based at least in part on a number of occurrences of respective actionable items within the identified actionable items; and generating information regarding the ranking of at least some of the actionable items.

Example T, the one or more computer-readable media of any of examples P-S, wherein the information indicates a class of at least one of the actionable items.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
one or more processors;
memory communicatively coupled to the one or more processors and storing data regarding a semantic hierarchy having one or more levels of nodes, with each node representing a class;
an input device communicatively coupled to the one or more processors and configured to receive data including free-form text;
mapping instructions stored in the memory and executable by the one or more processors to automatically map at least one word or phrase of the data to one or more levels of the semantic hierarchy and to map a class of the semantic hierarchy to a class of an ontology model;
feedback analysis instructions stored in the memory and executable by the one or more processors to use a mapping by the mapping instructions to tag words or phrases in the free-form text with one or more levels of the semantic hierarchy or respective classes of the ontology model and to match a grammar pattern of the tagged words or phrases to a grammar pattern associated with a concept of the ontology model comprising an actionable item in the received data, wherein the concept comprises at least one of a problem, suggestion, question, activity, and action that identifies one of an entity and a question and at least one of an associated state, condition, and symptom; and
feedback routing instructions stored in the memory and executable by the one or more processors to utilize the mapped at least one word or phrase of the data to send information regarding the analysis of the data by the feedback analysis instructions to a device associated with an individual for evaluation of the actionable item in the received data.

2. The system of claim 1, wherein the semantic hierarchy includes:
a first level having at least one node representing customer terms; and
a second level having at least one node representing at least one of morphological forms of the customer terms or technical terms for the customer terms.

3. The system of claim 1, wherein the actionable item includes at least one of a problem with a software or hardware entity, a suggestion for improvement of the software or hardware entity, or a question regarding a software or hardware entity.

4. The system of claim 1, wherein the data includes feedback that is provided via an operating system, feedback from an online source, feedback from a conversation with an agent, feedback provided via a customer support portal, feedback from an electronic message, or feedback from an evaluation form.

5. The system of claim 1, wherein the mapping instructions are configured to:
map the at least one word or phrase of the data to the semantic hierarchy by mapping the at least one word or phrase to a node at a first level in the semantic hierarchy and determining a node at a second level of the semantic hierarchy that corresponds to the node at the first level of the semantic hierarchy; and
map the node at the first or second level of the semantic hierarchy to a class of the ontology model.

6. The system of claim 1, wherein:
the feedback analysis instructions are configured to determine a type of the actionable item based at least in part on the mapped at least one word or phrase of the data; and
the feedback routing instructions are configured to send information to the device associated with the individual regarding the type of the actionable item.

7. A method comprising:
generating, by a computing device, an entity hierarchy having nodes that represent classes for an entity and an entity state hierarchy having nodes that represent classes for a state of the entity, each of the entity hierarchy and the entity state hierarchy including different levels of nodes;
receiving, by the computing device, user feedback including free-form text;
automatically mapping, by the computing device, a first word or phrase of the user feedback to the entity hierarchy and mapping a second word or phrase of the user feedback to the entity state hierarchy, and mapping a class of the semantic hierarchy is mapped to a class of an ontology model;
determining, by the computing device, that the user feedback relates to an actionable item for a software or hardware entity by tagging words or phrases in the free-form text with one or more levels of the entity hierarchy or respective classes of the ontology model and matching a grammar pattern of the tagged words or phrases to a grammar pattern of the received user feedback associated with a concept of the ontology model comprising an actionable item in the received user feedback, wherein the concept comprises at least one of a problem, suggestion, question, activity, and action that identifies one of an entity and a question and at least one of an associated state, condition, and symptom;
determining, by the computing device, an individual to inform of the user feedback based on at least one of the mapped first word or phrase to the entity hierarchy or the mapped second word or phrase node to the entity state hierarchy; and
making available information regarding the user feedback to a device associated with the individual to evaluate the actionable item in the received user feedback.

8. The method of claim 7, wherein at least one of the entity hierarchy or the entity state hierarchy includes a first level having at least one node representing customer terms, and a second level having at least one node representing at least one of morphological forms of the customer terms or technical terms for the customer terms.

9. The method of claim 7, wherein the entity hierarchy includes nodes that represent words or phrases that relate to the software or hardware entity and the entity state hierarchy includes nodes that represent words or phrases that relate to at least one of a problem for the software or hardware entity, a suggestion for the software or hardware entity, or a question regarding the software or hardware entity.

10. The method of claim 7, wherein:
the mapping includes mapping the first word or phrase to a node in the entity hierarchy and mapping the second word or phrase of the user feedback to a node in the entity state hierarchy; and
the method further comprises:
determining a type of the actionable item based on at least one of the node to which the first word or phrase is mapped in the entity hierarchy or the node to which the second word or phrase is mapped in the entity state hierarchy; and
sending information to the device associated with the individual regarding the type of the actionable item.

11. The method of claim 7, wherein the actionable item includes a problem with the software or hardware entity, a suggestion for improvement of the software or hardware entity, or a question regarding the software or hardware entity.

12. The method of claim 11, wherein:
the mapping includes:
mapping the first word or phrase of the user feedback to a node at a lowest level in the entity hierarchy and traversing the entity hierarchy to a node at the higher level of the entity hierarchy; and
mapping the second word or phrase to a node at a lowest level in the entity state hierarchy and traversing the entity state hierarchy to a node at the higher level of the entity state hierarchy; and
the method further comprises:
mapping the node at the higher level of the entity hierarchy to a first class of the ontology model, and mapping the node at the higher level of the entity state hierarchy to a second class of the ontology model;
tagging the first word or phrase of the user feedback with the first class of the ontology model, and tagging the second word or phrase of the user feedback with the second class of the ontology model; and
determining that the user feedback relates to at least one of the problem, the suggestion, or the question for the software or hardware entity based at least in part on the grammar pattern of the tagged user feedback.

13. The method of claim 7, wherein the user feedback includes one or more sentences in a natural language format.

14. The method of claim 7, further comprising:
ranking the actionable item associated with the user feedback with respect to actionable items of other user feedback based at least in part on occurrences of the actionable item within a plurality of pieces of user feedback; and
making available information regarding the ranking to the device associated with the individual.

15. One or more computer-readable media storing computer-executable instructions that, when executed by the one or more processors, cause the one or more processors to perform acts comprising:
receiving a plurality of documents, individual ones of the plurality of documents including free-form user text;
analyzing individual ones of the plurality of documents based at least in part on one or more semantic hierarchies that each have different levels of nodes for different classes of words or phrases;

identifying actionable items for at least some of the plurality of documents based at least in part on the analysis by tagging words or phrases in the free-form user text with one or more levels of a semantic hierarchy or respective classes of an ontology model, wherein a class of the semantic hierarchy is mapped to a class of the ontology model, and matching a grammar pattern of the tagged words or phrases to a grammar pattern of the free-form user text associated with a concept of the ontology model comprising an actionable item in the free-form user text, individual ones of the actionable items including at least one of a problem, suggestion, question, activity, and action that identifies one of an entity and a question and at least one of an associated state, condition, and symptom;

generating information regarding at least some of the actionable items; and making the information available to evaluate at least some of the actionable items in the free-form user text.

16. The one or more computer-readable media of claim 15, wherein the identifying the actionable items includes identifying, for individual ones of at least some of the plurality of documents, a node in the one or more semantic hierarchies that is identified from the analysis that relates to a problem, suggestion, or question class.

17. The one or more computer-readable media of claim 15, wherein the generating the information includes:

generating information that identifies a particular actionable item that occurs most frequently, within the identified actionable items, for a particular software or hardware entity.

18. The one or more computer-readable media of claim 15, wherein the generating the information includes:

ranking at least some of the actionable items based at least in part on a number of occurrences of respective actionable items within the identified actionable items; and generating information regarding the ranking of at least some of the actionable items.

19. The one or more computer-readable media of claim 15, wherein the information indicates a class of at least one of the actionable items.

* * * * *